United States Patent [19]

Reddy et al.

[11] Patent Number: 5,096,584

[45] Date of Patent: Mar. 17, 1992

[54] SPIRAL-WOUND MEMBRANE SEPARATION DEVICE WITH FEED AND PERMEATE/SWEEP FLUID FLOW CONTROL

[75] Inventors: Damoder Reddy, San Ramone, Calif.; Keith Denslow, Midland, Mich.

[73] Assignee: The Dow Chemical Company, Midland, Mich.

[21] Appl. No.: 585,230

[22] Filed: Sep. 19, 1990

Related U.S. Application Data

[63] Continuation-in-part of Ser. No. 471,539, Jan. 29, 1990, abandoned.

[51] Int. Cl.$^5$ ............................................. B01D 63/10
[52] U.S. Cl. ........................... 210/321.74; 210/321.83; 210/497.1
[58] Field of Search ................. 210/321.74, 321.78, 210/321.83, 321.87, 497.1

[56] References Cited

U.S. PATENT DOCUMENTS

| | | | |
|---|---|---|---|
| 3,367,504 | 2/1968 | Westmoreland | 210/321 |
| 3,397,790 | 8/1968 | Newby | 210/321 |
| 3,417,870 | 12/1968 | Bray | 210/321 |
| 3,668,837 | 6/1972 | Gross | 55/158 |
| 3,872,014 | 3/1975 | Schell | 210/232 |
| 3,874,986 | 4/1975 | Browall | 161/160 |
| 3,962,095 | 6/1976 | Luppi | 210/321 |
| 4,033,878 | 7/1977 | Foreman | 210/321 |
| 4,134,742 | 1/1979 | Schell . | |
| 4,293,378 | 11/1981 | Klein . | |
| 4,299,702 | 10/1981 | Bairnji | 210/433.2 |
| 4,301,013 | 10/1981 | Setti | 210/637 |
| 4,545,862 | 11/1985 | Gore | 203/10 |
| 4,548,714 | 11/1985 | Kirwan | 210/232 |
| 4,745,430 | 5/1988 | Cooley | 210/321.85 |
| 4,765,893 | 8/1988 | Kohlheb | 210/315 |
| 4,814,079 | 3/1989 | Schneider | 210/321.83 |
| 4,814,082 | 3/1989 | Wrasidlo | 210/490 |

*Primary Examiner*—Frank Sever

[57] ABSTRACT

The present invention relates to a spiral-wound membrane module having a semi-permeable membrane which has a central high pressure premeatae region flanked on opposite sides by two lower pressure edge portions. The edge portions facilitate the dispersion of and the collection of the feed fluid being treated and assist in obtaining a more uniform flow of the feed fluid through the high pressure region of the membrane. In one embodiment, the module has entrance and exit flow means for a counter-current flow of a sweep fluid through the permeate. Preferably, the high pressure permeate region is a high density porous spacer flanked on two sides with low density porous spacers. In one embodiment, the higher pressure permeate region and flanking low pressure drop permeate regions are obtained by specifically positioned lines of adhesive or glue spots (or lines) having a specific size and spacing. Generally the spots (or lines) are positioned in a generally axial configuration to the central pipe. Generally, the glue spots or lines are positioned in the permeate passageway in a pattern to obtain controlled flow of the countercurrent, cocurrent, or crosscurrent sweep fluid.

26 Claims, 22 Drawing Sheets

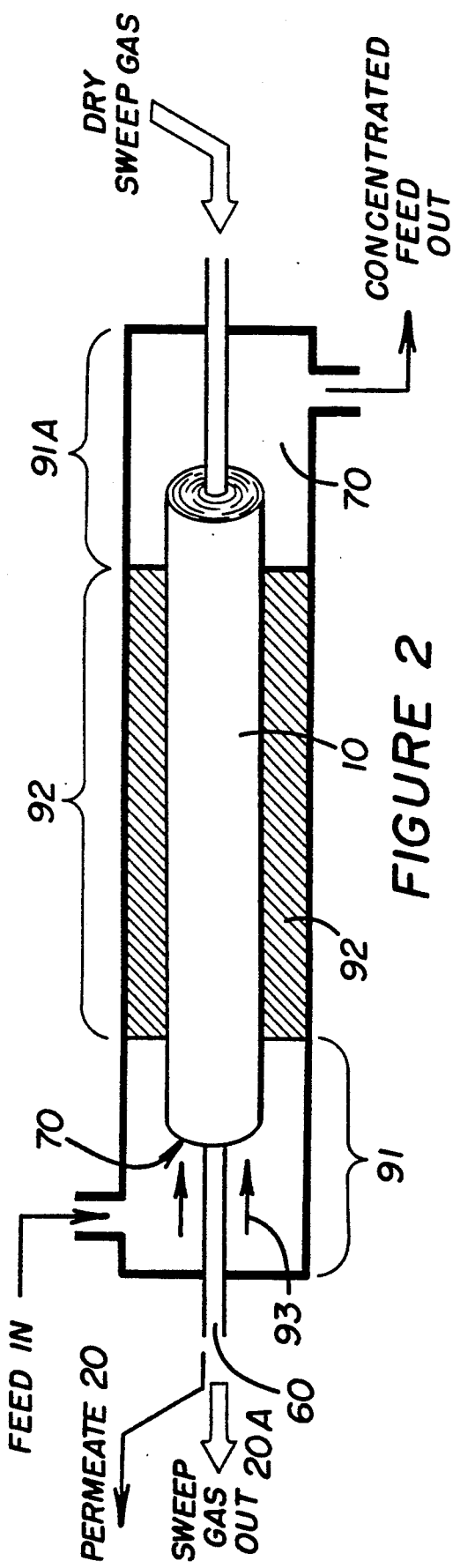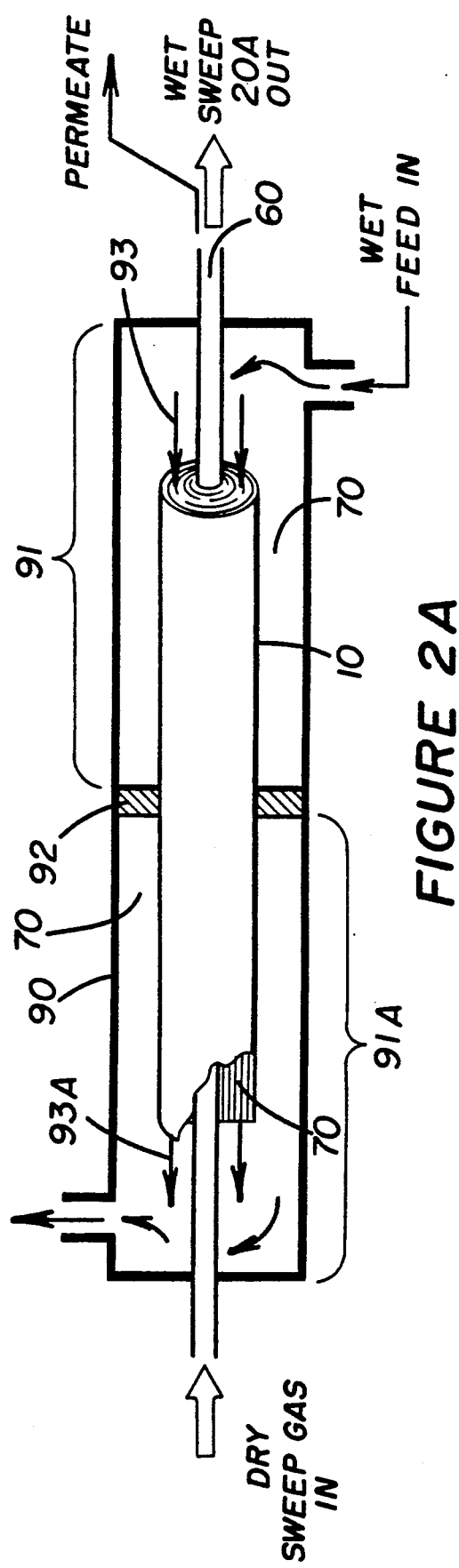

SPIRAL-WOUND MEMBRANE SEPARATION DEVICE WITH FEED AND PERMEATE/SWEEP FLUID FLOW CONTROL

BACKGROUND OF THE INVENTION

1. Related Applications

This application is a continuation-in-part of U.S. Ser. No. 471,539, filed Jan. 29, 1990, which is incorporated by reference in its entirety.

2. Field of the Invention

The present invention relates to improved designs for a spiral-wound membrane separation device. The module has a permselective membrane envelope and a fluid permeate spacer region which has a central higher density (higher pressure drop) (or lower porosity) area flanked by higher porosity (or lower pressure drop) edge portions which more uniformly disperse and then collect the fluid permeate in contact with the membrane envelope. In specific embodiments, the device has a countercurrent, cocurrent or crosscurrent flow of a sweep fluid (gas) through the permeate passageway.

3. Description of the Related Art

Dehydration of gases or liquids requiring removal of a small amount of water needs extremely efficient flow distribution. While hollow fibers have very high surface area, they lack the desired flow distribution characteristics. Also, for highly water swellable membranes, such as perfluoroethylene sulfonic acid (PFSA), NAFION$^R$, etc., hollow fibers cannot be used at high pressures due to their poor mechanical properties. Spiral wound designs have much improved flow distribution and permit the membranes to be used at high pressures by using a dense permeate spacer to support the desired pressure differential across the membrane. However, none of the known spiral wound module designs permit a flow of a sweep fluid (gas) through the permeate channel in a countercurrent, (crosscurrent or cocurrent) configuration, and hence cannot be effectively used for applications requiring sweep fluid.

Many types of membrane separation apparati, devices or modules are found in the published and patent literature. See, for example, the following U.S. Patents for general and specific descriptions:

R. L. Gross, 3,668,837; W. R. Browall et al., 3,874,986; L. Luppi, 3,962,095; G. A. Newby, 3,397,790; G. E. Foreman et al., 4,033,878; M. Klein, 4,293,378; R. Bairinji et al., 4,299,702; D. Setti et al., 4,301,013; W. F. Gore et al., 4,545,862; J. R. Kirwan, Jr. et al. 4,548,714; T. E. Cooley, 4,746,430; R. Kohlheb, 4,765,893; B. M. Schneider, 4,814,079; and W. J. Wrasidlo, 4,814,082.

More specifically, W. J.. Schell in U.S. Pat. No. 3,872,014 discloses a module of a spiral design which uses a permselective membrane suitable for separating a permeate from a fluid mixture of the general type employing two permselective membranes spaced from each other by a backing material to provide a passageway between them in which the membrane permeate is collected. This patent does not describe a high density (higher pressure drop, or lower porosity) central region flanked by two lower density (lower pressure or higher porosity) edge regions to assist in the flow of the permeate fluid (or feed fluid) more uniformly across the membrane surface. This patent does not disclose the present invention's countercurrent (crosscurrent or cocurrent) sweep fluid (or carrier fluid) to further remove permeated gas, vapor or liquid from the permeate passageway.

All references, patents, articles, standards, materials, etc. cited herein are incorporated by reference in their entirety.

At the present time, crude natural gas produced offshore is usually transported using metal pipes to equipment on land for further purification. The crude natural gas contains a number of impurities, such as water, carbon dioxide and the like. This mixture of gases is corrosive to the metal pipe, and the pipes need to be replaced within a short time, e.g. a few years, at great cost, and with interruption of the natural gas production.

It is desirable to have a module design which has a permselective membrane envelope having a combination of spacer means having a high density (lower pressure drop or lower porosity) central region generally contacted on opposite sides by lower density (higher pressure drop or higher porosity) regions to assist in more uniform (controlled) flow distribution of the sweep fluid in the permeate channel or in the feed channel. It is also desirable to have a membrane separation device having a design permitting a countercurrent (crosscurrent or cocurrent) flow of an additional sweep fluid to carry away the permeate fluid. The design incorporating a sweep fluid is much more efficient in the separation of some components than the separation without the sweep fluid. A highly water permeable or water selective membrane spiral wound module would be very useful to purify, e.g. dehydrate, natural gas offshore. The present invention provides for an improved design and membrane separation module.

SUMMARY OF THE INVENTION

The present invention relates to a spiral wound membrane module having a semipermeable membrane for use in the separation of a permeate from a fluid feed mixture, comprising a centrally located hollow pipe, at least one unsealed membrane envelope enclosing at least one porous fluid feed spacer means, and at least one permeate spacer means for controlling the permeate flow in the permeate passageway, and optionally controlling the flow of a countercurrent (crosscurrent or cocurrent) fluid in the permeate, wherein the generally hollow pipe has a wall barrier intermediate in its length dividing the pipe into a first compartment and a second compartment, the pipe having means for collecting a fluid permeate stream from the first compartment of the pipe and means for collecting and removing the permeate fluid stream from the second compartment of the pipe, the first and second pipe compartments each having at least one axial opening through the pipe circumference through which permeate fluid will pass, the at least one unsealed membrane envelope comprises the sheet membrane produced by creating a feed passageway having a first surface and a second surface, which is opposite to the first surface, wherein the membrane is folded once or sealed, producing an envelope having the crease or sealed edge adjacent to and parallel with said pipe, so that first one-half of the first surface of the membrane layer faces the other half of the first surface of the membrane envelope creating a fluid feed passageway and interposed between the first and second surfaces of the first membrane is at least one porous fluid spacer means for providing substantially uniform flow of feed fluid, a permeate passageway which is formed by the adjacent membrane surfaces opposite to the first membrane surface wherein the adjacent surfaces opposite to the first surface are sealingly adhered to each other, having the at least one permeate spacer means to provide substantially uniform fluid flow in the permeate fluid passageway between the adjacent membrane envelope surfaces opposite the first surface, the at least one permeate spacer means is attached to said pipe in fluid communication with the axial fluid openings of the first and second pipe compartments producing a permeate passageway, means for removal of permeate fluid from the permeate fluid passageway to the exterior of the module using the pipe, and means for restraining the unspiraling of the compact module roll under operational conditions.

In one embodiment, the at least one permeate spacer means comprise three juxtapositioned interconnected spacer regions A-B-C wherein an outer lower density (higher porosity) region A and an outer lower density (higher porosity) region C are each in fluid connection on one edge with the pipe axial openings and a second axial side of region A and a second axial side of region C are each in fluid communication with opposing sides of high density (lower porosity) region B, wherein region A at the edge axial to the pipe first receives the incoming fluid at lower pressure drop which is next in fluid communication with the intermediate pressure drop region B which is in fluid communication with lower pressure drop region C wherein region B is not directly in fluid communication with any axial opening of the first and second compartments of the pipe.

In one embodiment, the module is contained in a sealed housing having means to introduce and remove the fluid feed.

In another embodiment the module includes in its hollow pipe additional means for injecting a countercurrent (crosscurrent or cocurrent) sweep fluid in the one compartment of the pipe; and means for removing the countercurrent sweep fluid from the other compartment of the pipe.

In still another preferred embodiment, the module has a low density region A and a low density region C which comprise at least one low density spacer means, and a high density region B comprises at least one high density spacer means.

In another preferred embodiment, the module has spacer regions A, B and C which are formed together as an integral unit.

In another embodiment, differential fluid flow in the fluid feed passageway and in the fluid permeate passageway, e.g. regions D, E and F, are produced using multiple adhesive spots in a generally axial configuration to the pipe wherein the glue spots have a predetermined size and spacing from one another for the purpose of controlling the flow of fluid in the permeate passageway.

In another aspect, the present invention relates to a membrane separation device which device comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral would module and the interior wall of the housing, the spiral-wound membrane module being designed to separate the fluid feed stream into a permeate stream and a concentrate stream, (c) means to completely annualar clearance space between the exterior surface of the module and the interior surface of the housing creating a first chamber and a second chamber, (d) means to introduce a feed stream to the spiral-wound membrane module in the first chamber means to withdraw a concentrate stream from said second chamber, and (e) means to withdraw a permeate stream, wherein the spiral wound membrane module comprises:

a centrally located hollow pipe, at least one unsealed membrane envelope enclosing, at least one fluid feed spacer means to provide substantially uniform fluid feed flow, and at least one permeate spacer means to provide substantially uniform permeate fluid flow, and optionally controlling the flow of the countercurrent, crosscurrent or cocurrent fluid in the permeate passageway, wherein the generally hollow pipe has a wall barrier intermediate in its length dividing the pipe into a first compartment and a second compartment, the pipe having means for removing a fluid permeate stream from the first compartment of said pipe and means for removing a permeate fluid stream from the second compartment of the pipe, said first and second pipe compartments each having at least one axial opening through the pipe circumference through which permeate fluid will pass, the porous permeate spacer means is in fluid communication with the axial fluid openings of the first and second pipe compartments, the at least one membrane envelope comprising a sheet membrane creating a feed passageway having a first surface and a second surface opposite to the first surface wherein the membrane is folded once so that first one-half of the first surface of the membrane layer faces the other half of the first surface of the membrane envelope and interposed between the first and second surfaces of the membrane is said porous sheet fluid feed spacer means to control the fluid flow in the feed passageway, the permeate passageway for the fluid permeate which is formed by the adjacent membrane surfaces opposite to the first surface, having a porous spacer in the permeate passageway between the adjacent membrane envelope surfaces opposite the first surface, means for removal of permeate fluid from the permeate fluid passageway to the exterior of the module, and means for restraining the unspiraling of the compact module roll under operational conditions.

In one embodiment, the permeate spacer means comprise three juxtapositioned interconnected regions A-B-C wherein the outer higher porous region A and outer higher porous region C are each in fluid communication on one edge to the pipe axial openings and a second axial side of region A and a second axial side of region C are each connected to opposing sides of lower porosity region B, wherein region C axially receives the incoming countercurrent fluid feed at low pressure which is in fluid communication with the high pressure region B which is in fluid communication with lower pressure region A wherein region B is not directly in fluid communication with any axial opening of the first and second compartments of the pipe.

In one embodiment, a permeate passageway is present having a distribution reservoir at the edge of the membrane receiving a countercurrent or cocurrent sweep fluid wherein the pressure drop of the sweep fluid within the permeate channels is controlled by strategically placed line barriers.

BRIEF DESCRIPTION OF THE DRAWINGS

FIGS. 2 and 2A are front view schematic representations of the module shown encased in an outer housing.

DETAILED DESCRIPTION OF THE INVENTION AND PREFERRED EMBODIMENTS

Definitions

Figure 1:
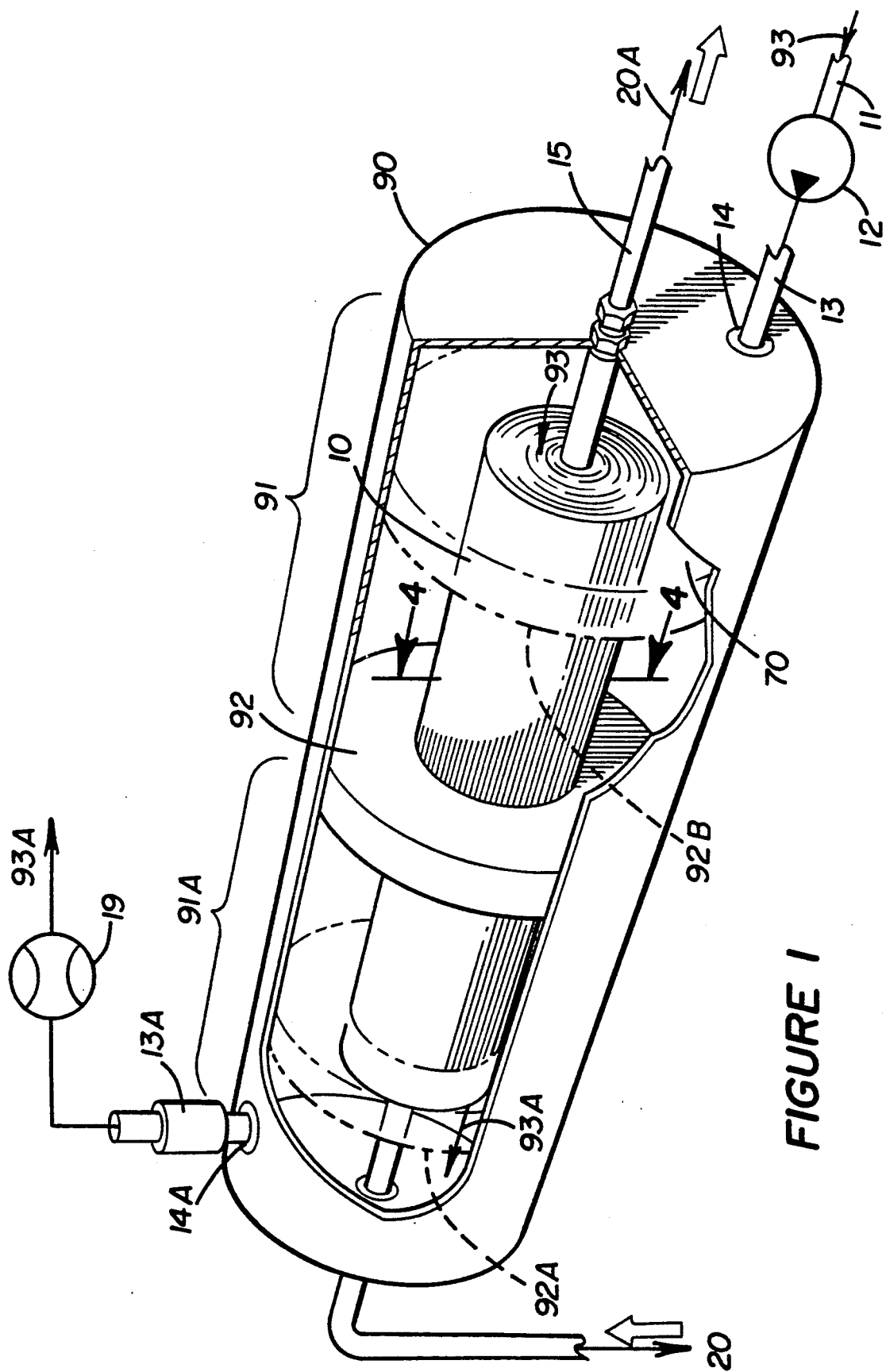
FIG. 1 is a perspective of one embodiment of the module of the invention in a housing for ultrafiltration or for reverse osmosis of a fluid stream or gas separation or gas dehydration.

As described herein:

"Feed spacer means" refers to any permeable (or porous) material which provides the structural stability and chemical stability in the presence of the fluid to be separated at the temperature and pressure of the fluids present. These spacer materials can be selected, for example, from organic polymers, such as polycarbonate, polyurethane, poly(vinylchloride), poly(ethylene), poly(propylene) polyepoxides, polyamides, polyesters and the like; from ceramics, such as silicon nitride, silica, titania, zirconia, alumina and the like; or from metals such as platinum, iron, steel, aluminum, copper, cobalt and the like. The known methods of the art are used to produce the desired level of porosity. Combinations can be used to obtain specific porosity. The "feed spacer means" also refers to specifically placed barriers (e.g. polymeric adhesive (glue) spots or lines which provide the desired degree of fluid control within the feed passageway.

"Permeate spacer means" refers to permeable (or porous) materials located within the permeate passageway. See the definitions for feed spacer means. The feed spacer means and permeate spacer means can be the same or different depending on the application or arrangement. Specifically, the flow of the permeate and of a sweep fluid in the permeate passageway can be controlled by the use of barriers, i.e. glue spots and/or polymer lines which are strategically positioned within the passageway. See the Figures for more detail.

"Permselective" refers to any selectively permeable membrane. The selectivity may be for water, a fluid, or for separation of components of natural gas, or oxygen from nitrogen, and the like.

GENERAL DISCUSSION

The module design of this invention permits permselective membranes to be used at high pressure differentials. U.S. Pat. No. 3,872,014 cited above has serious limitations at high pressure, e.g. about 50 to 100 psi or above, in that any adhesive seals present leak or burst. The present invention also enables the use of sweep gas in a countercurrent (crosscurrent or cocurrent) configuration by the use of a unique combination of permeate spacer (means). In this design only the permeate channel is sealed to the membrane and to a central tube, whereas, the feed channel is not sealed at all, thus allowing the feed fluid (liquid or gas) to enter through one open end of the module and exit through the other open end. A pressure housing (chamber) is designed to enclose the module which withstands the high pressure and yet allows the feed fluid to enter the module only from one end and allows it to exit at the other end maintaining nearly the same total pressure inside the pressure chamber and inside the feed channel of the module. This novel design eliminates the possibility of leaks induced by the high pressure feed. Since the sweep fluid (gas) used is always under lower pressures, the adhesives used to seal the edges of the membrane and permeate spacers maintain the permeate channel substantially leak-free.

Module designs of the present invention are used to dehydrate natural gas at pressures of up to 2000 psi. The module is used in any membrane application that requires the use of sweep gas or liquid. This module design also can be used for removal of carbon dioxide or water from natural gas using a membrane semipermeable to carbon dioxide or water. The module can also be used for facilitated transport membranes requiring a sweep gas.

In this design, feed fluid enters the module 10 from one end and exit from the other end. The permeate spacer and the membrane are completely sealed, and the pipe is in fluid communication with the permeate spacer. When a high pressure feed is used in the design of U.S. Pat. No. 3,872,014, the adhesive seals usually leak and/or blow out, unless the seals are particularly strong or reinforced. On the other hand, in the present invention, any adhesive seals are under compression. The fluid feed spacer is not sealed to the membrane, hence when the pressurized feed proceeds through the module, it is not held by any seals thus eliminating the problem of seal breaking during operation.

Figure 13:
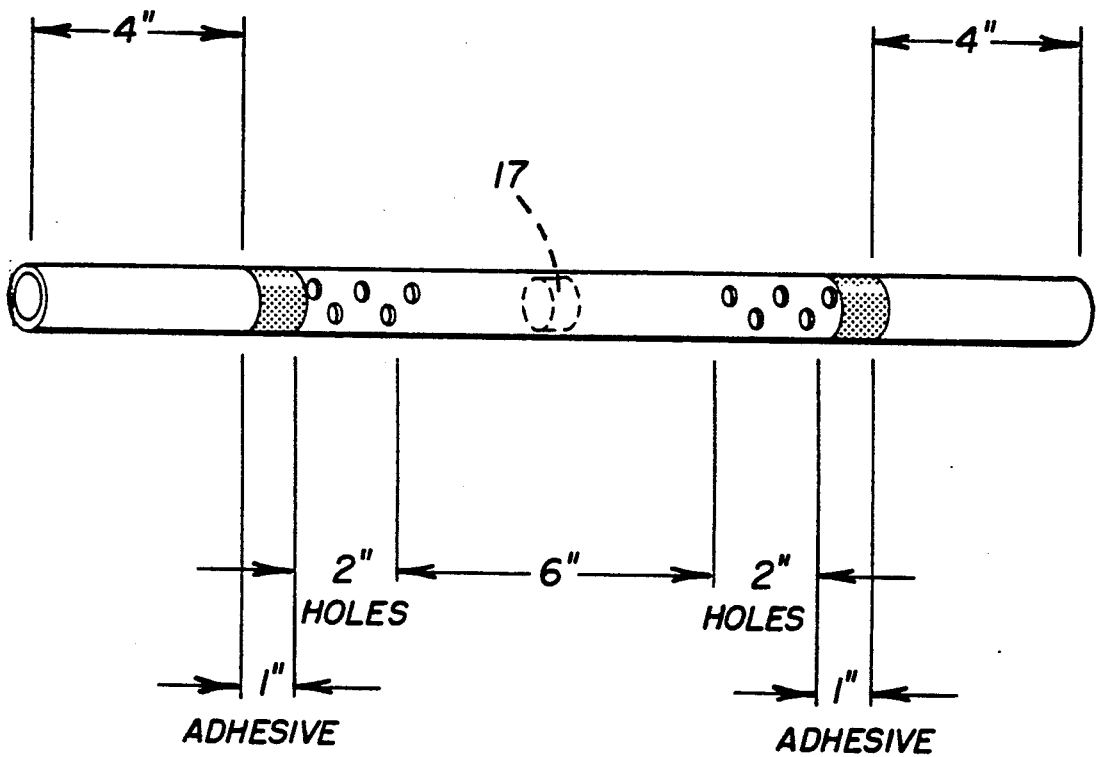
FIG. 13 contains the dimensions of one embodiment as described in Example 1 below.
Figure 24:
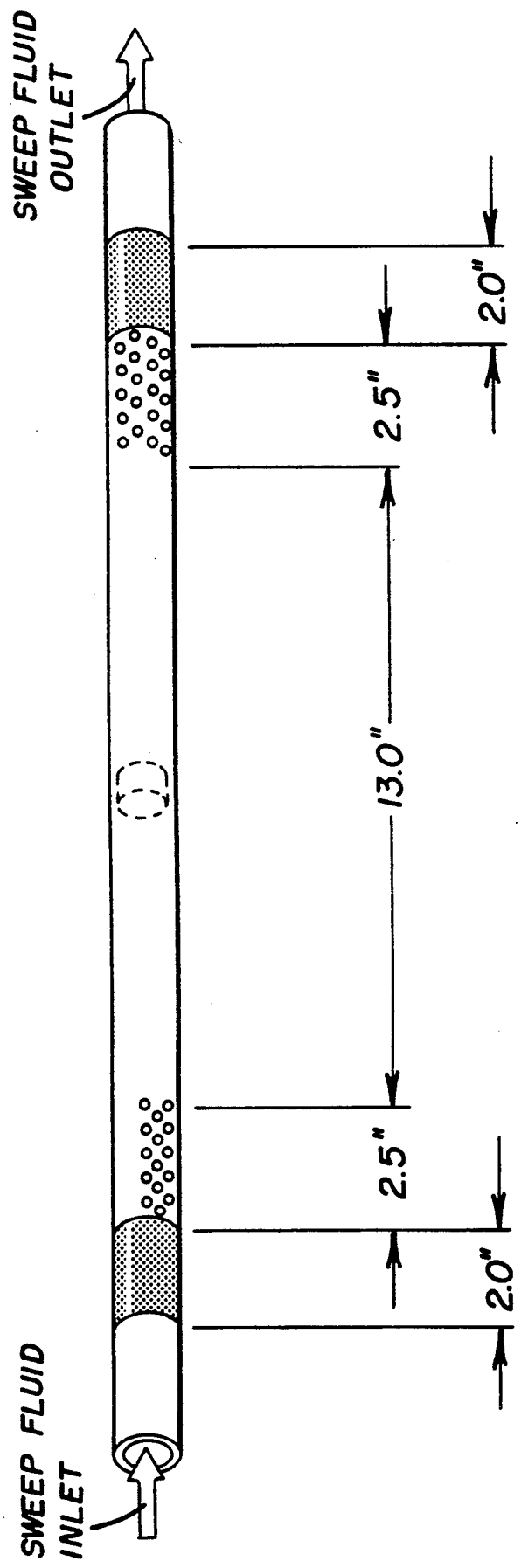
FIG. 24 shows the dimensions of the pipe and holes for the embodiment wherein the sweep fluid enters a reservoir prior to sweeping through the spiral membrane.

To achieve the countercurrent configuration in the permeate flow channel, a set of spacer means combinations are used. A metal or plastic pipe is sealed (plugged) in the middle and openings (holes) drilled as shown in FIG. 13 or 24. A combination of dense and open spacers can be used to achieve the desired fluid sweep flow in the permeate. An open spacer (low pressure drop) is sandwiched between the two dense spacers at the two ends as shown in FIG. 3B. In the central (middle) region, an open spacer is not used and only the dense spacers are used. The holes in the pipe which is attached to one end of these permeate spacer combinations are drilled such that they fall in the edge regions containing the open spacer sandwiched between the dense spacers at the edges of the dense spacers. Because of the relative pressure drops in the three regions in FIG. 1, 2, 3 or 5 marked "A", "B", and "C" when the sweep gas enters through the central tube, which is blocked in the middle, it distributes generally evenly into the low pressure drop region marked "C" and then travels in a direction generally parallel to the pipe in the region marked "B" until it reaches the low pressure drop region marked "A", from which it enters through the holes into the pipe and exits the module at other end of the pipe. The region marked "B" is the active membrane surface region.

A major improvement of one embodiment of the present module design is that it creates similar flow patterns in the feed passageway and in the permeate sweep passageway.

DETAILED DESCRIPTION

The differences in the mode of operation and change in arrangement of the structural components of the module of the present invention as compared to the prior art structures is better understood in the detailed description which follows.

The materials of construction for the module are discussed in detail below and are substantially the same as the membrane spacer(s) adhesive, barrier, plug, pipe, etc. as is described in U.S. Pat. application Ser. No. 479,531, filed Jan. 29, 1990 and in U.S. Pat. application Ser. No.: 534,755 filed June 7, 1990, both of which are incorporated by reference in their entirety.

Referring to FIG. 1, there is shown a module 10 having a housing 90 incorporated in a system suitable for a number of fluid separations, e.g. relatively low pressure (or high pressure) reverse osmosis treatment of an aqueous stream. The fluid stream may be brackish water having a low concentration of salt or an aqueous stream containing dissolved toxic organic or inorganic materials. The feed stream may be natural gas which is to be separated into components and/or purified in that harmful or undesirable materials, e.g., water, carbon dioxide, hydrogen sulfide, etc. are removed. The module may also be used for ultrafiltration processing of aqueous solutions containing colloidal suspension or suspended solids, e.g. cheese whey, etc.

It is understood that the membrane used in the module is selected to accomplish the separation desired in the processing of a particular fluid or liquid stream.

Fluid Feed Stream—In FIGS. 1-5, the feed stream 93 to be processed is introduced at line 11 (optionally to a pump 12) from which it is transported at an elevated pressure through exterior pipe 13 and a coupling opening 14 in housing 90 which surrounds module 10. Pump 12 is not needed if the fluid (e.g., natural gas) is already at a high pressure. As is seen in FIGS. 1, 2 and 2A, housing 90 is divided into a first compartment 91 and a second compartment 91A by a solid barrier 92 situated at any one of a number of points intermediate of the length of module 10 (note the phantom outline of barrier positions 92A and 92B). As shown in FIGS. 1-5, the feed stream 93 entering module 10 in a passageway (hereinafter referred to as the feed passageway 70) of a laterally extending leaf structure illustrated in FIGS. 2, 3, 3A and 3B in a unspiraled condition).

The fluid permeate passageway 60 in the membrane area 51 is divided into a high permeability region 21 (or A) and a juxtapositioned adjacent lower permeability second region 22 (or B) which is connected on the opposite side to third higher permeability density region 23 (or C). The permeate passageway 60 maybe obtained by having at least one porous spacer sheet 51 between the second surfaces which are opposite to the first surface of the membrane (24A and 24B) formed from a single fold of the permeable membrane 24 (or 24A and 24B). In this way, first membrane surface of membrane 25A faces the first membrane surface of membrane 25B. Therefore, when high pressurized feed 93 passes through the edge surface of module 10, it is not held by any seals in passageway 70. (See FIG. 3A). This feature eliminates the problem of seal leakage or breakage during high pressure operation of the module.

In one embodiment, when the sweep gas is used (see open arrows) usually at low pressure, it enters region C in passageway 60 and is uniformly conveyed across region B and is collected in region A and exits pipe 15 with the permeate fluid.

Feed stream 93 less the permeate passes through the fluid feed spacer 26 and passes into second chamber 91A. Feed stream 93A (purified and somewhat more concentrated) is removed through coupling 14A as the processed stream effluent (see FIG. 1) and outlet pipe 13A.

Outlet pipe 13A optionally contains a throttling valve 19 which is used to regulate back pressure and controls the flow-through velocity of the feed stream. In the embodiment of FIG. 1, the permeate 20 and 20A exits from both ends of pipe 15 of module 10.

Optionally to improve performance, a microporous support 41 is placed between the membrane 24 and the permeate sweep spacer. An acrylic fabric commercially available from Gelman (3000H) of Ann Arbor, Mich. is preferred.

It is contemplated that a number of modules 10 may be connected in series or in parallel as needed for a particular separation application.

Figure 3:
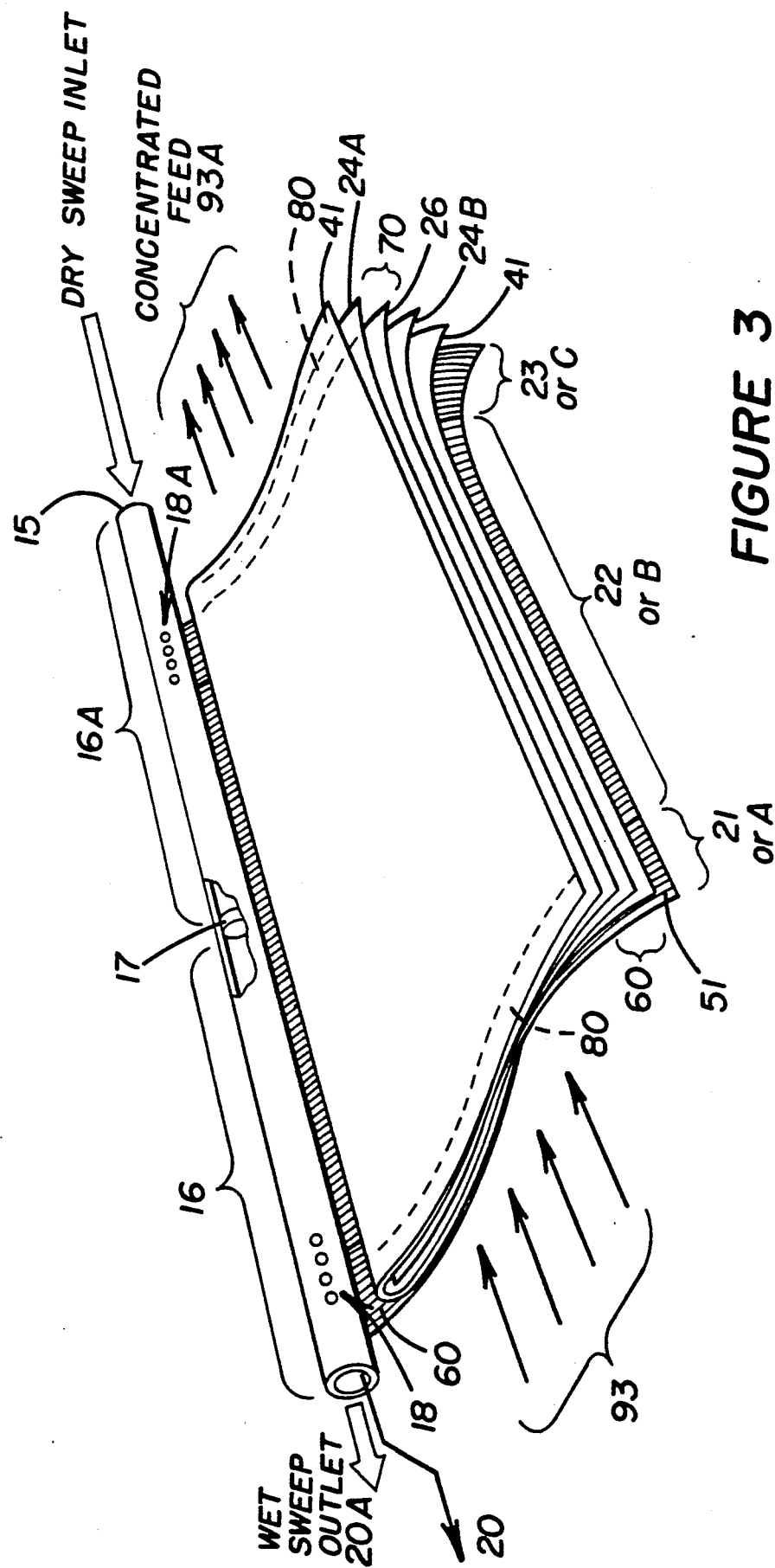
FIG. 3 is a fragmentary view of a membrane lay up employed in the fabrication of the module of FIG. 1.
Figure 3A:
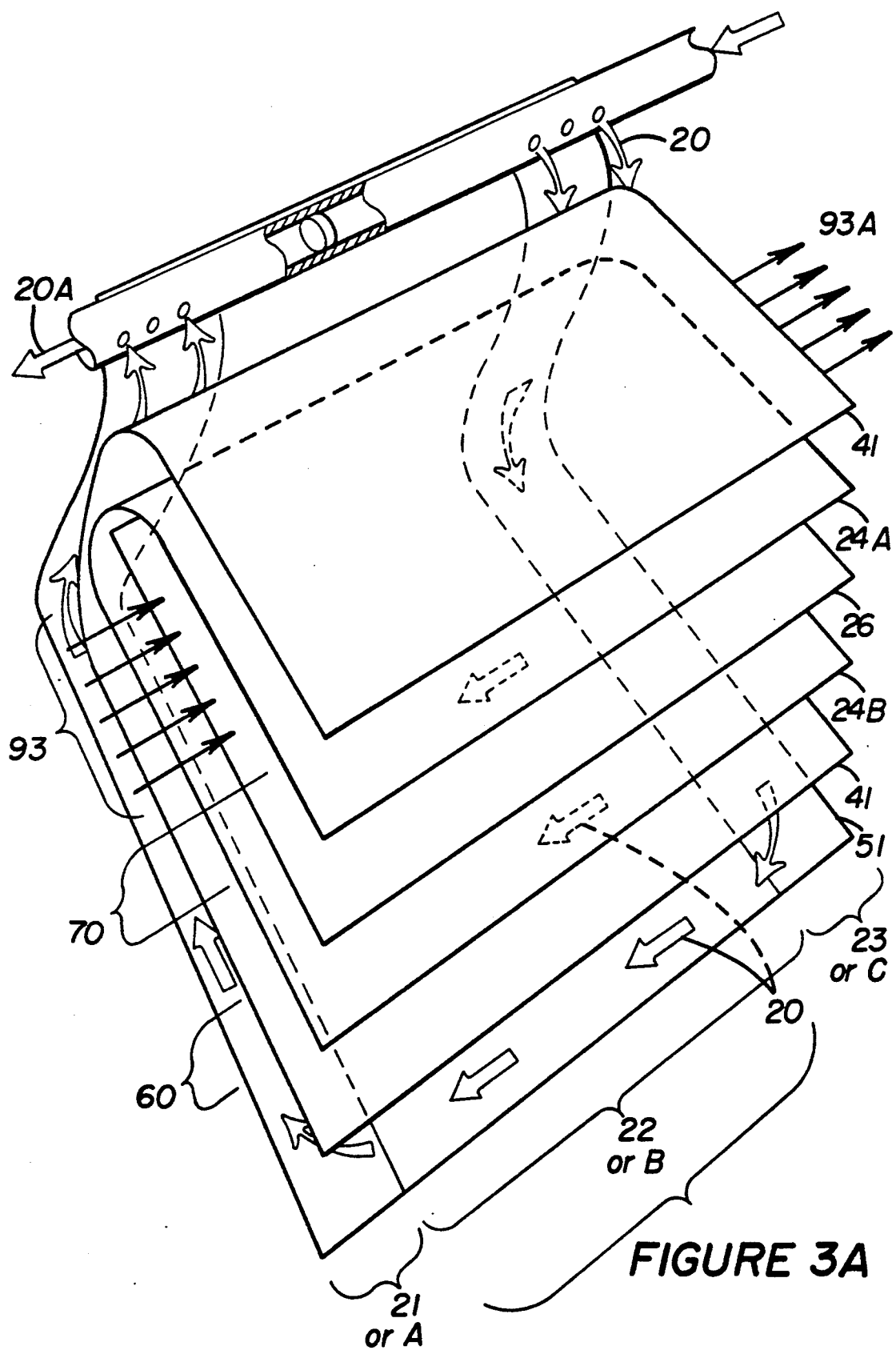
FIG. 3A is a fragmentary perspective view of one stage of a membrane lay up employed for fabrication of the membrane module of FIGS. 1 and 2.
Figure 3B:
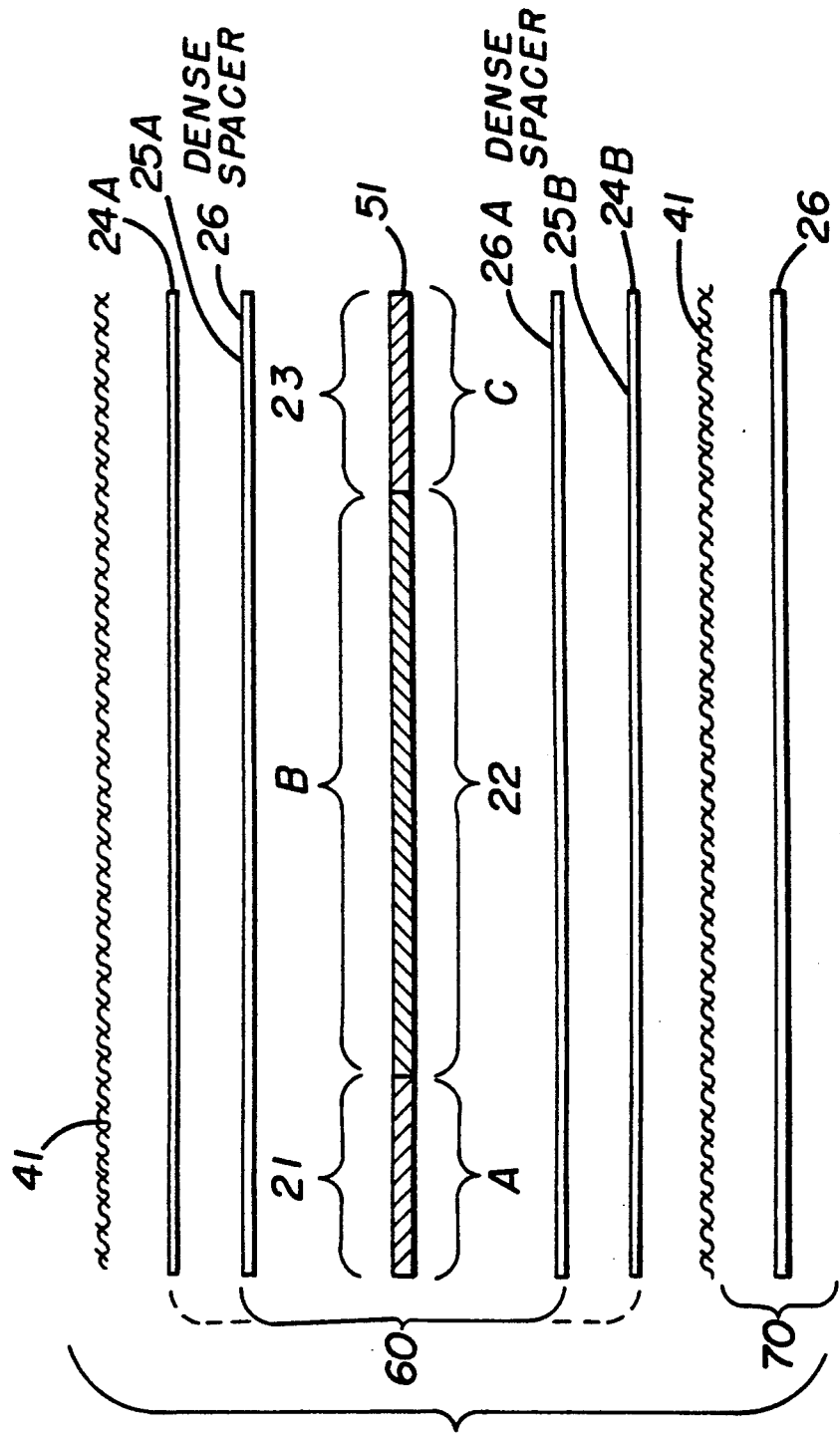
FIG. 3B is a front end schematic representation of the unspiraled multiple layers.
Figure 4:
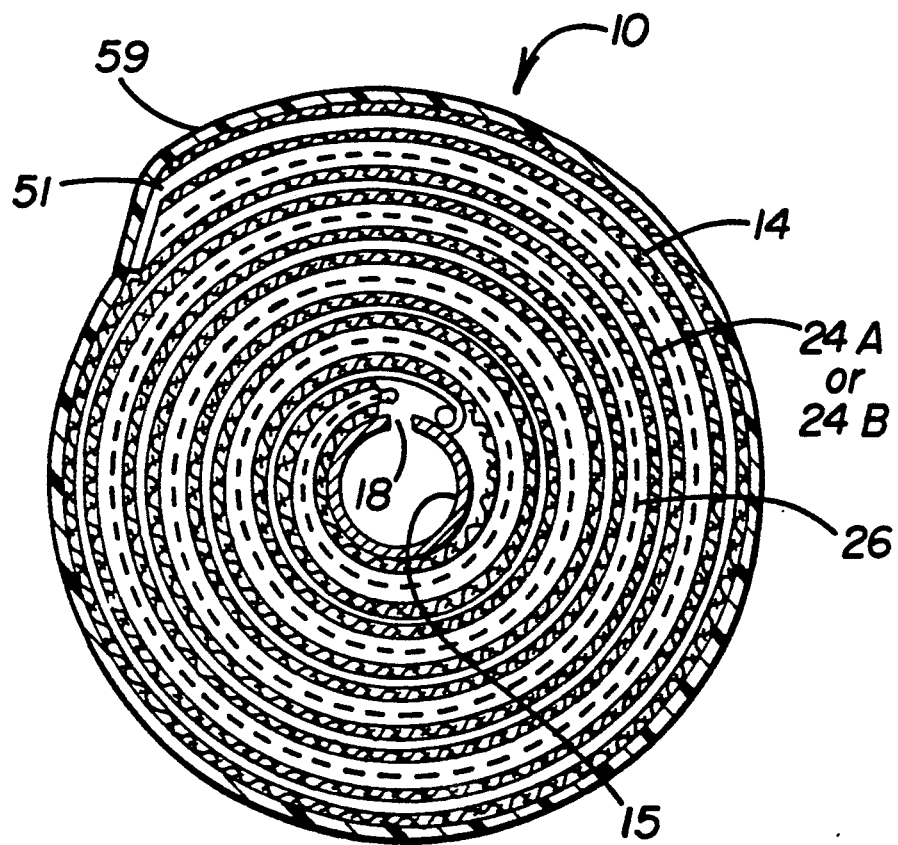
FIG. 4 is a cross-sectional view taken along line 4—4 of FIG. 1 and showing schematically the module in a preferred embodiment using a single leaf, made up of two spaced membranes spirally wrapped to form the compact module.
Figure 5:
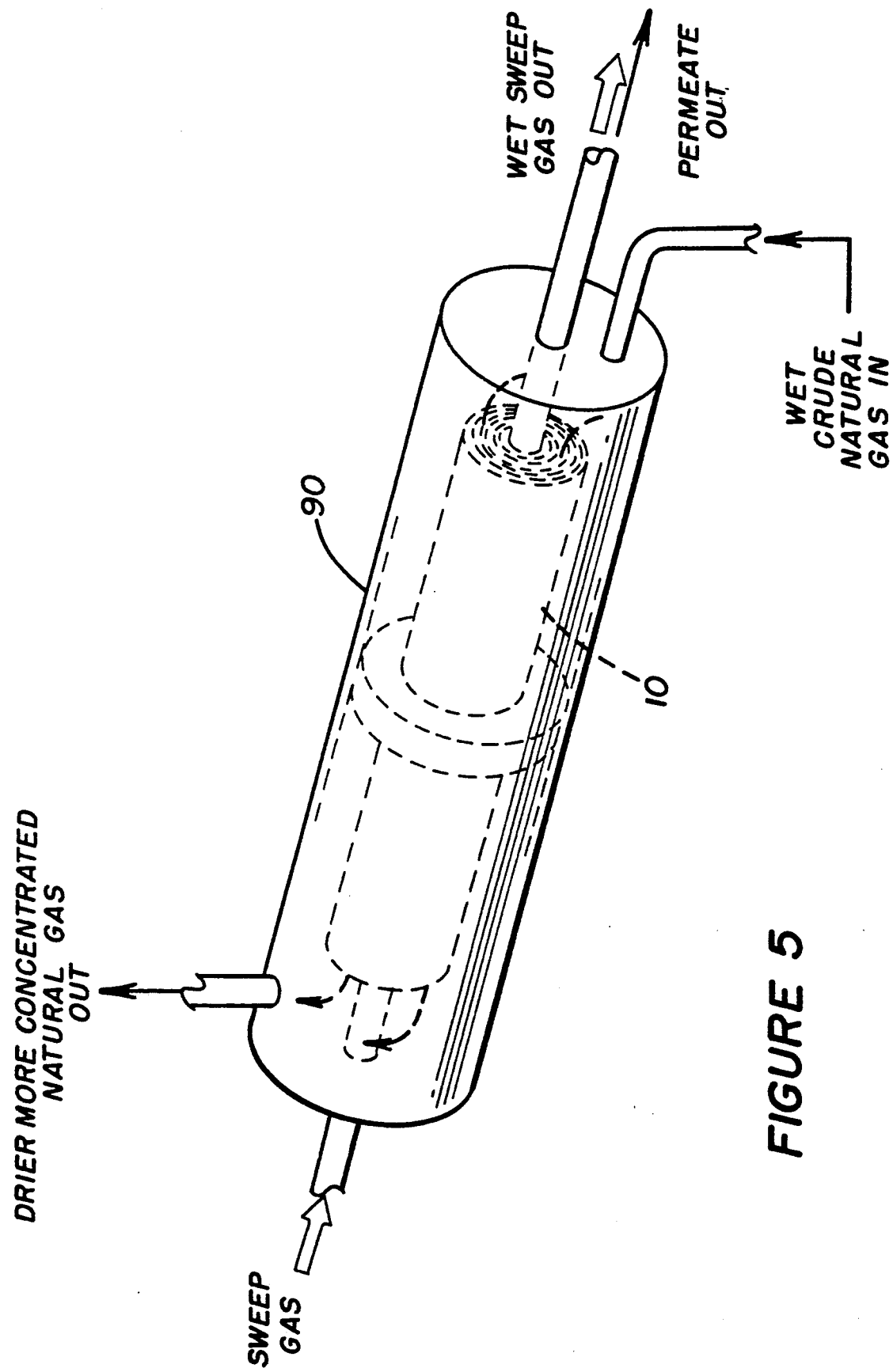
FIG. 5 is a schematic representation of one embodiment using a countercurrent sweep gas.

More structural details of module 10 are disclosed in FIGS. 1-5. FIGS. 3, 3A and 3B are perspective views of one stage in the membrane layup used in fabrication of module 10. It precedes in time the fastening of the layup to the pipe 15 (see FIG. 3). By rolling or spiraling the layup about pipe 15 as shown in FIG. 4, the spirally wound module 10 of FIG. 1 is obtained.

The interrelation of components of the leaf structure of the module 10 is perhaps best understood with reference first to FIG. 3, 3A and 3B. In one embodiment the membrane envelope 24A and 24B is formed from an elongated sheet of membrane material 24 which is folded at an intermediate point of its length of provide opposing permselective membranes. These membranes are separated by feed spacer 26 which defines a feed fluid passageway 70 through which the feed fluid passes. Alternatively, the folded envelope 24 may be to individual membrane sheets 24A and 24B that are sealed at only one edge immediately adjacent to pipe 15. The pressure of the feed can be low, e.g. 15 to 30 psi, or high from 30 to 2000 psi.

In one embodiment, the single elongated membrane sheet is prepared by casting a suitable membrane solution upon a permeable polymeric base cloth and processed under conditions well known in the art to form an asymmetric membrane. This embodiment is illustrated diagrammatically in FIG. 3. Optionally, the membrane may be a composite having a relatively thin active layer, and a thicker porous membrane support 41 which is often intermeshed with the polymeric base cloth. While the two layers are shown for illustration purposes as separate, they are often in reality an integral structure and the active layer 41 is much thinner than illustrated.

The permselective membrane can be homogeneous (having a thickness of between about 10-200 microns) and having first and second surfaces. The permselective membrane can also be asymmetric having one active surface and a surface opposite to the active surface.

The permselective membrane can be a composite membrane. The spacer separation material 26 of the feed passageway 70 may take various forms and for instance, where the module is being employed for ultrafiltration or possibly low pressure reverse osmosis separations, the backing material may be a tricot spacer cloth with the openings of the tricot fabric being relatively loose so as to promote high fluid flow of the permeate through the premeate passageway in a generally-parallel direction to the pipe 15. The permeate spacer material 51 is permeable and conveniently comprises in some applications a permeable, flexible, thin sheet (usually polymeric) which has formed on both its surfaces fine corrugations or pores which serve to transport the permeate to the opposite ends of the module. Where module 10 is being utilized in gas separation, the backing material may take even a still different form and comprise a more open grid sheet which presents still less impedance to fluid permeate flow. An open grid netting (discussed below) marketed under the name Simplex, is a suitable material. Other materials include, for example, VEXAR®, polymeric tricot, metal screening, ceramic screening and the like. Thus, it is seen, the backing material like the particular membrane employed is selected to optimize the particular fluid separation being accomplished. Details of membrane casting solutions and casting conditions that may be employed for membrane fabrication are known to the art and are not elaborated upon here.

As mentioned earlier with reference to FIG. 1-5, there is a feed fluid passageway 70 which serves the purpose of presenting the fluid feed being processed to the outside (or active) thin layers of the permselective membranes 24. The means of defining the feed fluid passageway 70 may take the form of a very open fabric or an open grid sheet material in the form of a netting spacer 26 through which the fluid feed readily flows. A particularly suitable material for this purpose is a product marketed by Conwed Corporation under the trademark VEXAR®, which is available in various thicknesses and different mesh openings. Depending on the application, openings of one to six millimeters have been found suitable. The thickness of the open grid material may be varied by using a plurality of layers as well as by selection of a netting of a satisfactory initial thickness where available. Thus, these aspects are widely variable by simply selecting or layering commercially available spacer material. For reasons discussed more thoroughly below, the spacer element 26 defined by the netting 26 may typically have thickness of between about 10 to 100 mils (0.25 to 2.5 mm). The netting material is available in various plastics such as polyethylene, polypropylene and vinyl. Lines of adhesives 80 serve to define the boundaries of the two succeeding fluid permeate flow in regions A, B and C and to confine the permeate fluid therein, as well to bond the succeeding structure layers together upon the spiral wrapping of the membrane leaf and spacer sheet netting 26 about the pipe 15 to form the compact structure which illustrated in cross-section in FIG. 4. A particularly suitable adhesive for forming the adhesive line 80 are commercially-available polymeric adhesives, e.g. H. P. Fuller polyurethane or Dow epoxy material (DER) which is cured with a diamine, and sets up as a flexible solid with a variable cure time, typically about 2-24 hours or so. The surface of the membrane may be modified with chemical agents or with ionization to improve adhesive properties. It will be appreciated that the adhesive in penetrating the interstices of the membrane support 41 will in the spiral wrap module 10 effect a bonding of the spacer sheet to the opposite sides of the permselective membranes 24A and 24B on either side of the spacer 51 and between the permselective membranes on either side.

It will also be appreciated that in place of the porous sheet spacer 51 having regions A-B-C, the sheet spacer may be formed from an integral flexible, solid, non-porous plastic sheet and the interconnected regions A, B and C either cut or formed therein to provide the permeate passageway 60.

It will be seen with reference to FIGS. 3, 3A, 3B and 4 that the juxtapositioned regions high pressure drops A, intermediate pressure drop B and high pressure drop C may be of different configurations. Lower pressure regions A and C are usually more porous than region B. This can be accomplished by adding another layer of spacer material 51A and 51B or the use of a different spacer material.

Figure 6:
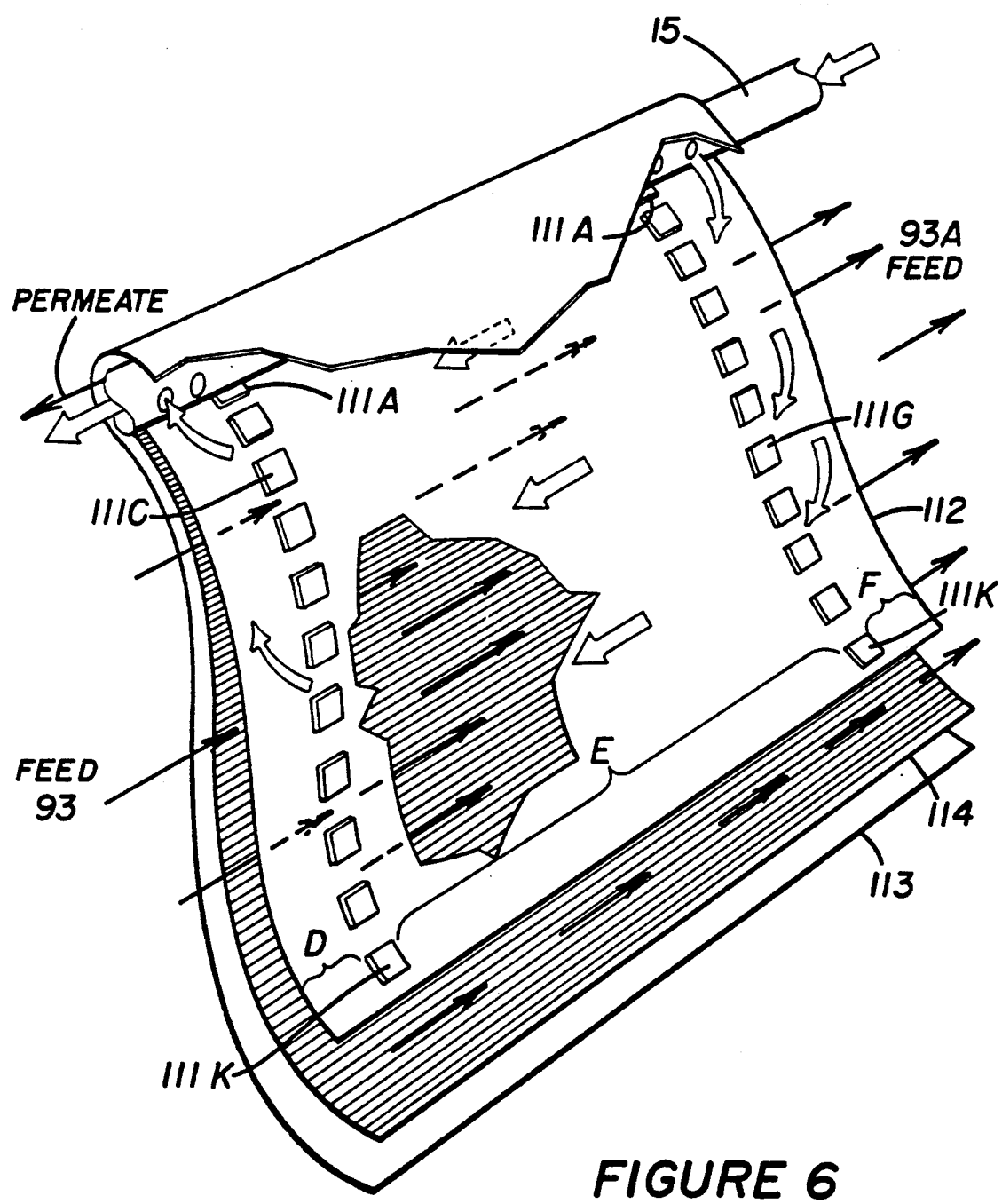
FIG. 6 shows an alternative embodiment using barrier (adhesive, glue) spots (or daubs or tabs) to produce controlled flow in the permeate passageway.

The layup of FIG. 3 is illustrative of a structure especially suitable for processing of a gas stream. Thus, it is seen that the netting spacer element 51 has no open channels cut or formed therein as found in the structures illustrated in FIGS. 3 and 4. Therefore, as is shown in FIG. 6 the succeeding juxtapositioned flow regions D, E and F of the fluid permeate passageway 60 are wholly defined by the several adhesive barriers (glue spots) or lines 111. Like the structure of FIG. 4, the successive permeate fluid flow regions D, E and F of FIG. 6 progressively diminish in width in the direction of fluid flow. The permeate sweep fluid flow in FIG. 6 is countercurrent entering at region F, crossing E and exiting through D. The permselective membrane of this gas separation structure is symmetrical or asymmetrical in cross-section and as prescribed in the earlier structures of FIG. 3 and 4, it is desirably formed in an elongated sheet which is folded intermediate of its length to provide the two opposing membranes with a porous spacer 26 located therebetween. For gas separations, the same open polymeric netting (VEXAR®) may be employed for both the feed fluid passageway 70 (through which the liquid or gaseous feed stream flows) as well as for the backing material of the first fluid passageway 60 in which the permeate fluid collects.

In pipe 15 the permeate fluid flow in region A as well as in region C diminish in width with in the direction of fluid flow. Hence, opening 18A into the second compartment 16A may be proportionately shorter in length than a first openings 18 of the first pipe compartment 16. In dialysis, the slits and the two compartments will be of equal length suitable for use with the feed passageway 70 of FIG. 3.

Pipe 15 may be formed of metal or plastic whichever best serves the intended use and is typically of the dimensions of about 18 to 72 in (45 to 180 cm) in length and about ¼ to 2 in (1.2 to 5.1 cm) in outside diameter. The wall thickness is selected to provide the required structural strength. The holes in the pipe can be adjusted in size, number and shape as needed.

The modules of FIGS. 1-5 are also usually provided with restraining means to prevent the module from unwrapping. Any plastic, metal, ceramic and the like may be used. In one embodiment, a fiberglass-reinforced Mylar industrial tape wrapping forms the outermost layer of the respective structures. In some applications it may be desired to wrap the fiberglass-reinforced tape several times around the module for additional strength.

As is shown in FIGS. 1-5 a single set of feed 70 and permeate 60 passageways are created using the permselective membranes and spacers. It is understood that this is the basic configuration. However, multiple sets of membrane leaves and spacers may be provided and spirally wound about pipe 15.

Barrier Spots—(Glue Soot) Module—In another aspect as shown in FIGS. 6, the present invention relates to a module which has the advantage of continuous process of manufacture of its component layers. The fabrication is simple and uses fewer materials. In this embodiment, two sheets of the permselective membrane 112 and 113 are separated by a feed spacer 114. One sheet of membrane 113 is positioned first and the feed spacer 114 is placed on the top of the first membrane 112. Barrier (glue, adhesive) spots 111A to 111K are placed on spacer 112 at specific points (as shown). The specific spacing between the glue spots and their location provides the proper degree of control of the flow in the permeate and in the countercurrent sweep fluid.

The two sets of adhesive spots do not need to be in parallel lines to each other or substantially the same in placement, spacing or configuration. The only requirement is that they provide control of the sweep fluid to produce substantially uniform sweep fluid flow across the active portions of the permselective membrane.

Figure 10:
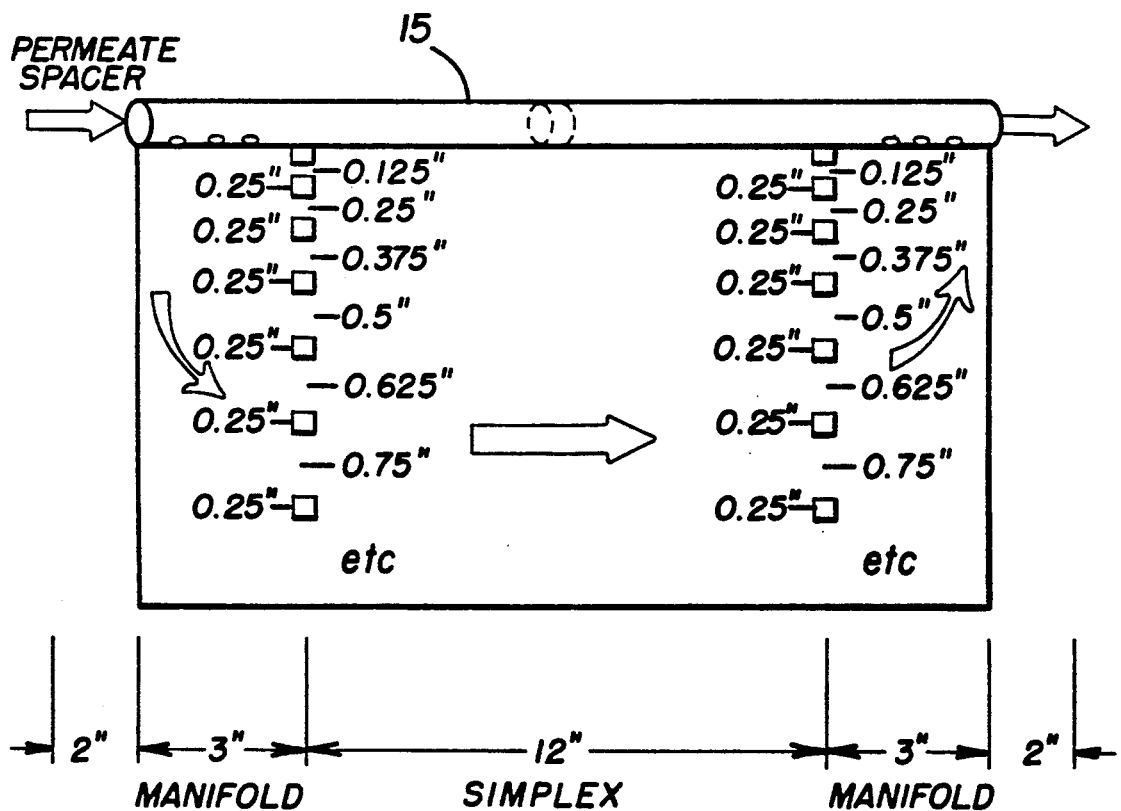
FIG. 10 shows a plan top view of the permeate spacer design using barrier (e.g., polymer, glue adhesive) spots.

In one embodiment, first glue spots of about 0.25×0.25 in. are placed in parallel lines radially to pipe 15, and adjacent to the edge of the attached pipe about 3 inches in from the opposite edges of the permeate membrane 112 and 113. The second glue spots 111B or lines are then placed 0.5 inches from the first two radially away from pipe 15. The third glue spots 111C are then placed 0.375 inches from the second ones. The glue spots are then continued in two generally parallel lines adding about 0.125 inches in spacing between adjacent glue spots at 111K. See FIG. 10.

The fluid separation obtained by these glue spot modules is comparable to those described earlier using different density spacers. See Examples 2 and 3 below.

The countercurrent fluid (open arrows) in FIG. 6 enters region F and is in passageway 60 and is conveyed substantially uniformly across active region E through the glue spots into region D and exits the module with the permeate.

Figure 11:
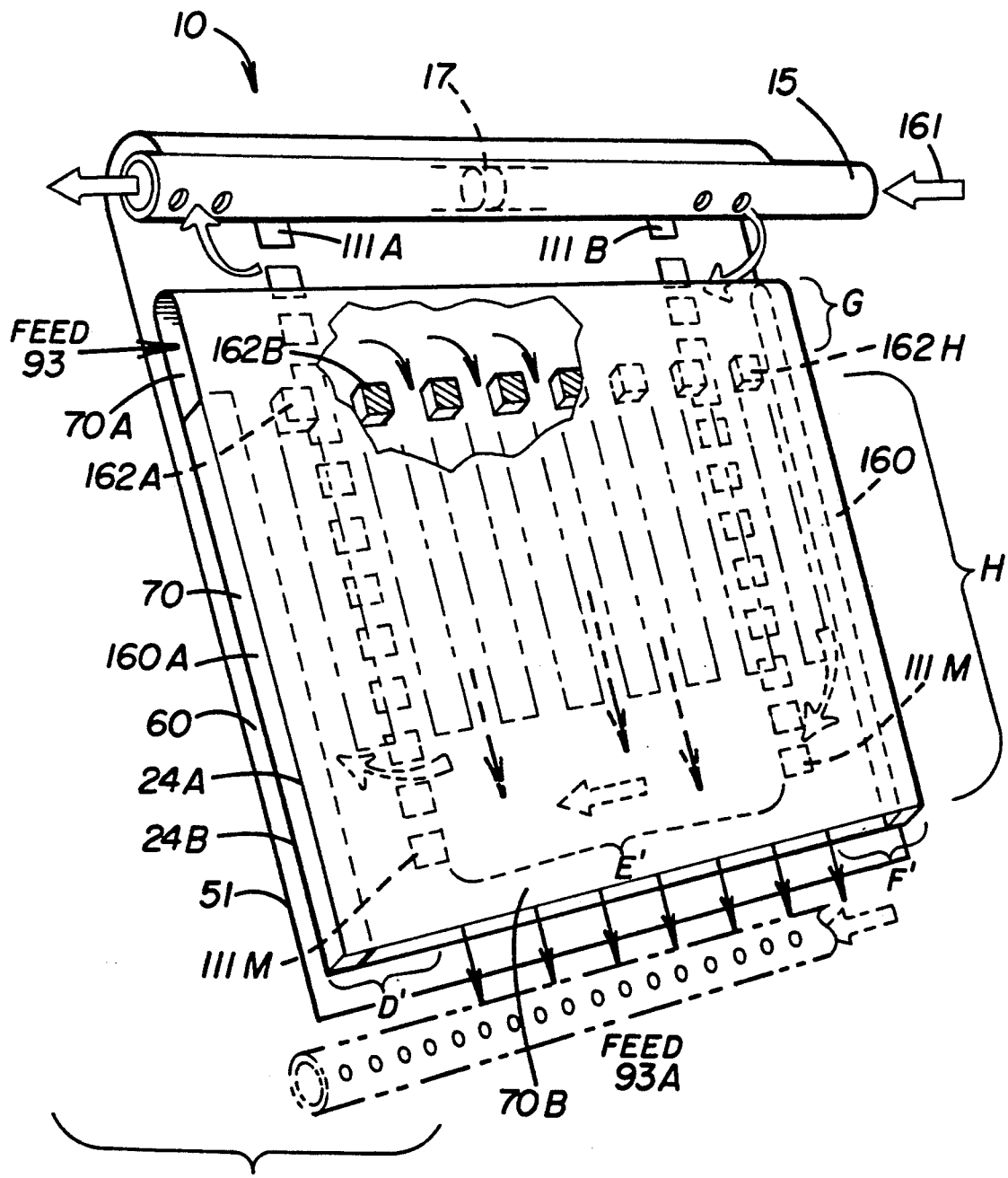
FIGS. 11 and 12 are cutaway schematic representations of the unwound module having barrier spacers (glue, spots) to control the fluid flow in the feed passageway which are generally parallel to the pipe, and adhesive spacers (glue spots) to control the crosscurrent sweep fluid flow in the permeate spacer which are generally in a radial position relative to the central pipe.

Crosscurrent Sweep Fluid—The previous discussion relates primarily to configurations for a countercurrent sweep gas. As is seen in FIG. 11, module 10 is shown in which the sweep fluid 161 in permeate passageway 60 crosses the permselective membrane at substantially a right angle to the flow of the feed 93 in upper feed passageway 70. Two aspects are changed from the previously discussed design, e.g. FIG. 6. First, the feed passageway 70 is formed by sealing membrane 24A or 24B completely along side 160 and 160A except for opening 70A and 70B. The fluid feed 93 enters module 10 at 70A and the feed flow is controlled by specifically placed adhesive (glue) spots 162A to 162H in the feed passageway. The feed flow is then axial to pipe 15 and exits the module at 70B. This edge 70B of module 10 is not sealed but may be partially wrapped with some wire, tape, porous material or the like to keep the module from unwinding. In permeate channel 60 are found glue spots 111A to 111M. These glue spots divert the flow of the sweep gas 161 (enter Region F' to Region E' to exit at Region D') s that it crosses membranes 24A and 24B in the sealed permeate passageway 60 substantially at a right angle to feed flow 93.

In an optional countercurrent configuration of FIG. 11 as shown in phantom outline near opening 70B, permeate passageway 60 is sealed from feed passageway 70 having means of sweeping, e.g. a hollow pipe having radial holes in the circumference The adhesive spots 111A to 111 M are optional as is plug 17. The sweep gas 161A enters permeate passageway 60, passes between membranes 24A and 24B through spacer 51 and exits with permeate at either end of pipe 15. Pipe 15 now may have many radial openings along the length of the pipe to receive sweep fluid and permeate.

Figure 12:
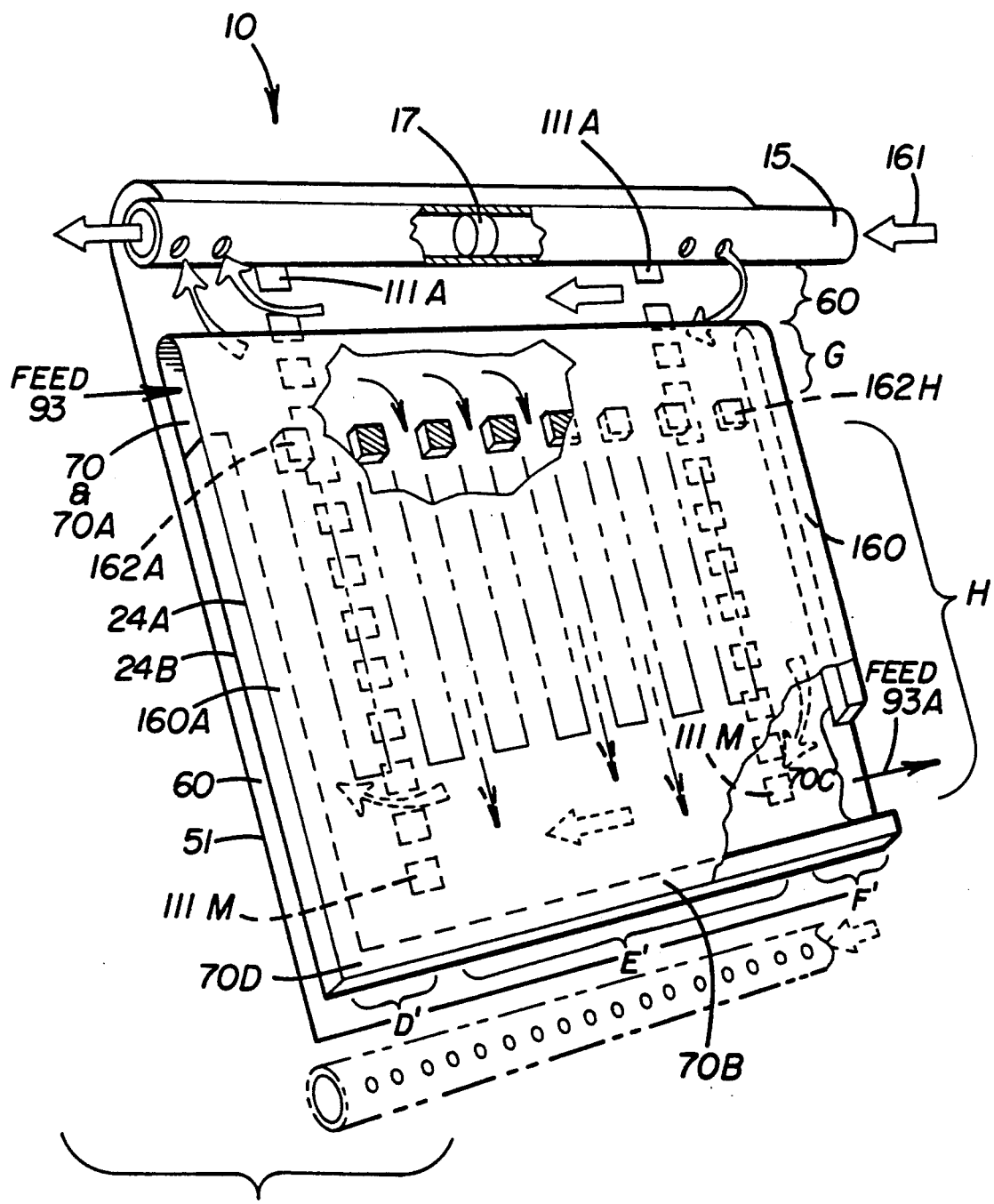

Another embodiment of the present invention is shown in FIG. 12 which is similar to FIG. 11. The membranes 24A and 24B, spacer 51, pipe 15 and glue spots 111A to 111M and 162A to 162H are substantially the same. The changes are that edge 160 for the feed passageway 70 is sealed except for opening 70C where feed 93A exits the module, and side 70B is sealed between 24A and 24B in the feed passageway 70. The permeate passageway is sealed as before. Thus in this embodiment feed 93 enters at opening 70A and is diverted by glue spots 162A and 162H to flow axially to pipe 15 and then exit from passageway 70 at opening 70C. The countercurrent fluid (open arrows) 161 enters region F' of permeate passageway 60 and is diverted by glue spots 111A to 111M to flow through region E' parallel to pipe 15 then into region D' and exit from the other end of pipe 145. This is a crosscurrent sweep fluid configuration.

One optional countercurrent sweep fluid configuration of FIG. 12 is shown in phantom outline. Near to side 70D, permeate passageway 60 is sealed from feed passageway 70 to means to introduce sweep gas, e.g. a hollow pipe having radial holes in the circumference. The adhesive spots 111A and 111M are optional as in plug 17. The sweep gas (open arrows) 161B enters permeate passageway 60, at region F passes uniformly between membrane 24A and 24B (having spacer 51 region E) and exits with the permeate from region D at either end of pipe 15. Pipe 15 now may have more axial openings along the pipe to receive the permeate and wet sweep fluid. Thus with some modification, a countercurrent, crosscurrent or cocurrent action of sweep gas is obtained.

Figure 7:
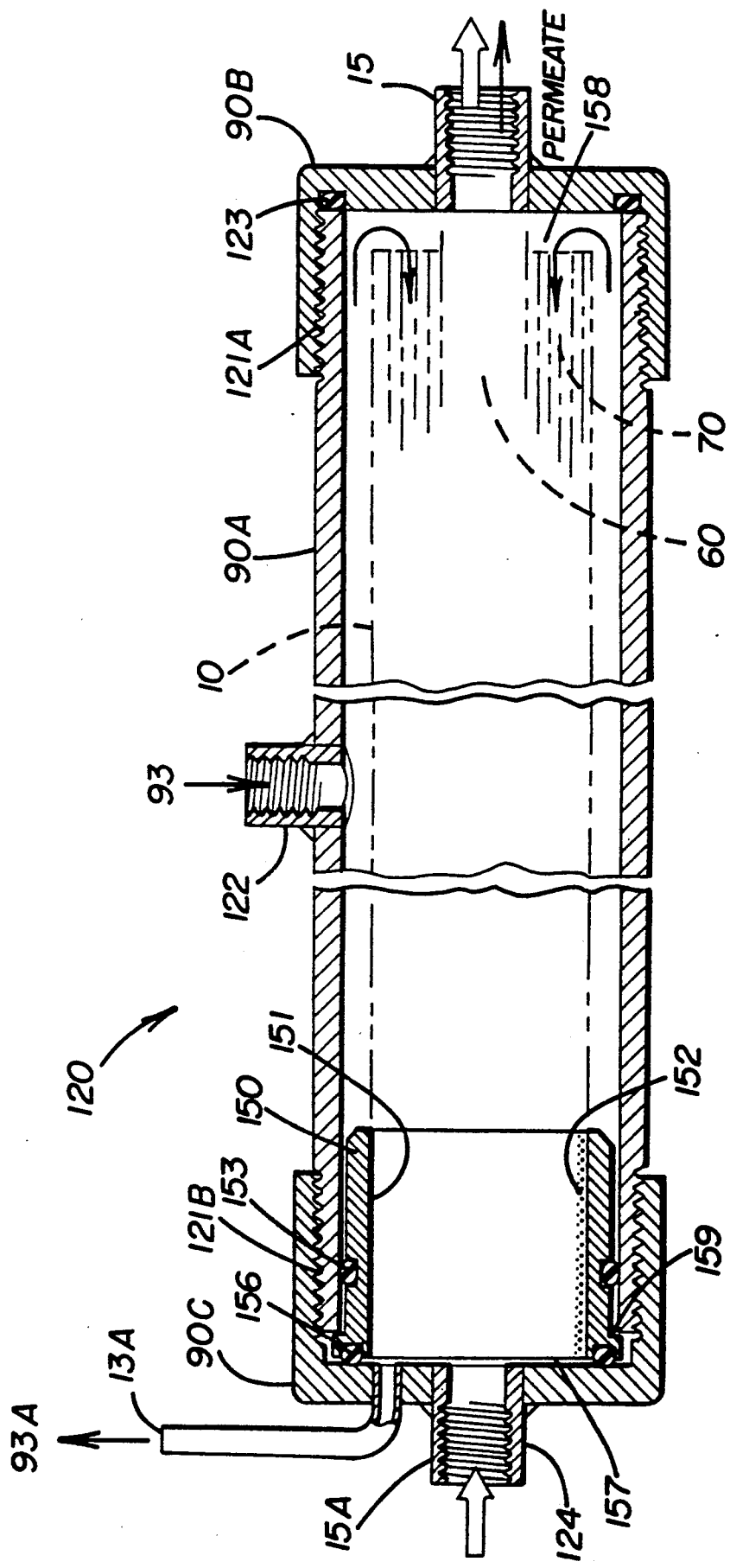
FIG. 7 shows a cylindrical housing having two end caps. The module when placed into this type of housing is usually subjected to high pressure.
Figure 8:
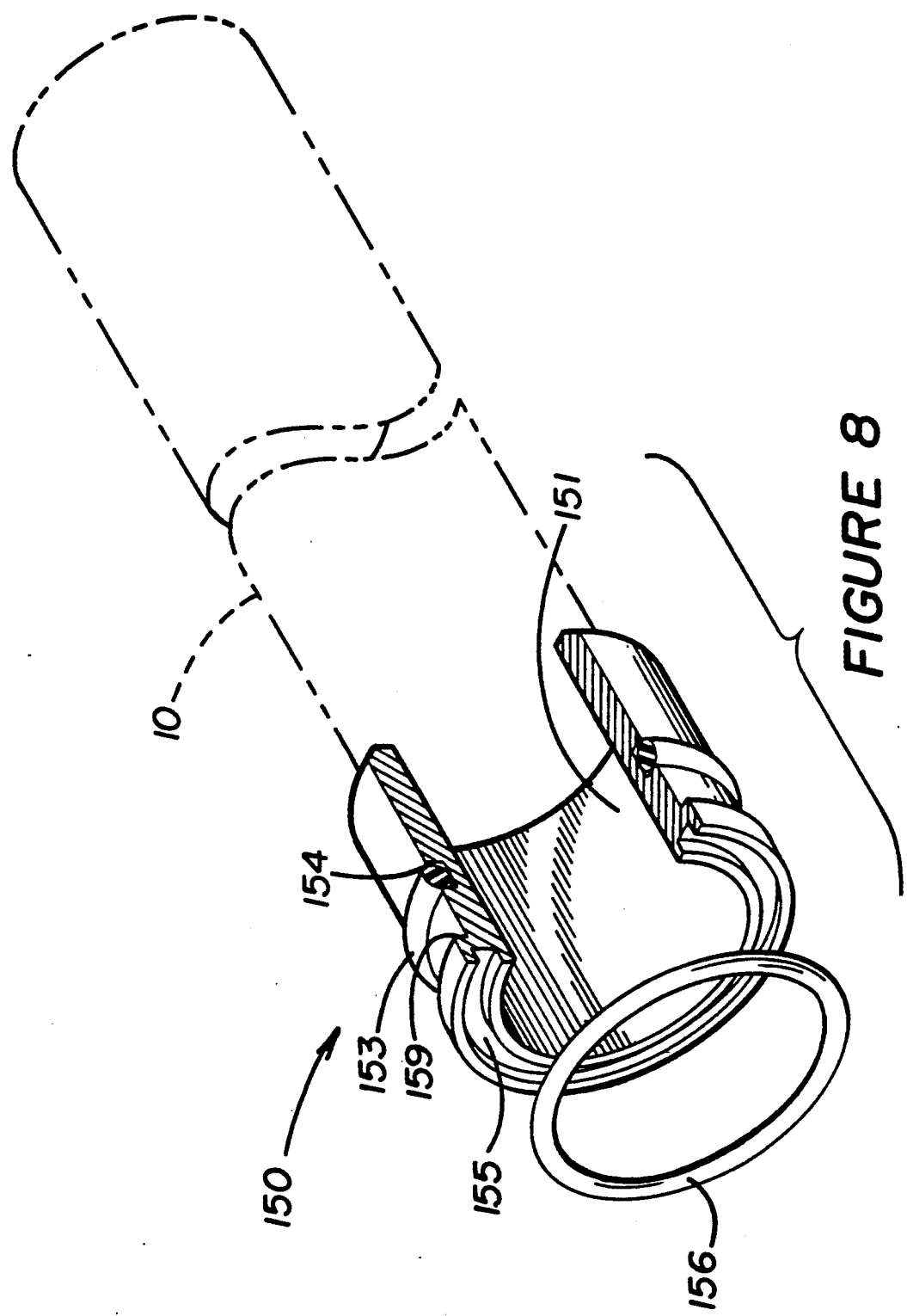
FIG. 8 is an isometric view of a specially designed sleeve with O-rings which fits within the housing to provide a good seal between the module and the housing.

In a preferred embodiment, a specially designed housing 90A is used with module 10 as is shown in combination 120 in FIG. 7 as shown. FIG. 8 is a specially designed sleeve 15 for use with module 10.

Housing 90 A is a suitably sized hollow pipe having exterior threaded portions 121A and 121B at each end and an opening 122 where the feed fluid 93 enters the system. One end of housing 90A has a threaded end cap 90B with an opening for pipe 15 for the permeate to exit module 10, having an O-ring 123 to assist in the tight sealing of end cap 90B. At the other end of the threaded pipe is a second end cap 90C which has an opening 124 for pipe 15A. A second pipe 13A and opening is for the exit of the processed feed fluid.

Within housing 90A is a specially designed sleeve 150. Sleeve 150 is a hollow cylinder of metal, plastic or the like, which assists in providing a tight seal between the feed channel 70 and the permeate channel 60. Aluminum for the sleeve 150 is preferred. The interior surface of sleeve 150 is a size only slightly larger than spirally wound module 10. Module 10 is adhered to the interior surface 151 of sleeve 150 using any adhesive means 152 including, for example, Dow polyurethane or H. P. Fuller or DuPont epoxy adhesive. Sleeve 150 has one groove 154 cut in the exterior surface large enough to insert a tight fitting O-ring 153. One end of sleeve 150 has an exterior circular groove 155 which accommodates a second O-ring 156. O-rings 123, 153 and 156 assist in the tight leak-free fitting of the housing 90A with the endcaps 90B and 90C. There is a small but finite space 158 between the circular end of module 10 and the interior surface of end cap 90B. This space 158 is useful for the uniform delivery of the feed fluid 93 to module 10 in feed passageway 70. There is a small but finite space 157 between the circular surface end of module 10 and the interior of endcap 90C. This space is needed to collect the treated feed 93A exiting module 10 and then housing 90A via line 13A. The 0-rings may be of any elastomeric material which will withstand the separation conditions. Suitable materials include neoprene rubber, poly(vinylfluoride) VITON ®, polytetrafluoroethylene (PTFE-TEFLON ®), and the like. VITON ® is preferred. In a preferred embodiment, sleeve 150 has a circular projecting edge 159 which facilitates the assembly of the separation apparatus by providing a stop point for module 10 during its insertion into the housing 90A.

As is seen in FIG. 6, the feed fluid passes over the top surface of membrane 112. A portion of the feed (or an impurity or component to be removed) permeates membrane 112 into the permeate passageway 60 about permeate spacer 114. The countercurrent fluid enters the permeate passageway through plugged pipe 15 and opening 18. The rate of dispersion of the countercurrent fluid in the permeate is controlled by the size and number of the adhesive spots 111 in the permeate spacer volume. The treated permeate and countercurrent fluid then exit pipe 15.

For example, moist natural gas (about 100 to 2000 psia) is used as the crude feed and dry low pressure fluid from about 0.1 mm Hg to up to the feed pressure gas, e.g. natural gas, methane or any other gas, is the countercurrent fluid. The water which permeates into the permeate passageway is continually removed (swept) by the dry sweep gas. The exiting natural gas feed 93A has most of the moisture removed. Generally, as the rate of sweep increases the rate of removal of the component from the permeate increases.

Facilitated Transport Spiral Wound Membrane

In another aspect, the present invention relates to removal of acidic or basic gases from gaseous or liquid mixtures. Facilitated transport membranes are known, see, for example, J. D. Way et al. (1989), *Journal of Membrane Science*, Vol. 46, pp. 309–324. Facilitated transport refers to the use of a mobile complexation agent in a membrane to selectively increase the flux of one or more of the permeating species which react reversibly with the complexation agent or carriers. The reactive membranes when used in the present invention achieve both high permeability and high separation factors. Ion exchange resins may be used as a support for complexation agents. The carrier cannot easily be forced out of the support since the carrier is retained by strong electrostatic forces.

For example, a NAFION ® or perfluorosulfonic acid (PFSA) polymer film can first be converted to the sodium salt and contacted with monopositive ions, such as monopositive ethylene diamine (HED+), to produce the facilitated transport membranes. Any positively charged counter ion includes for example $Ag^+$, $Li^{30}$, $Ba^{+2}$, $Ca^{+2}$, and the like. HEDA+ acts as a carrier for both carbon dioxide and hydrogen sulfide. Therefore, these materials can be removed from a natural gas mixture which includes species in addition to methane. Facilitiated transport, in general, requires the sweep gas in the permeate passageway. The module of the present invention is therefore particularly useful.

COUNTERCURRENT SWEEP FLUID

FIGS. 2 and 2A show the use of the sweep fluid gas shown as open arrows through the permeate passageway. The present invention makes it possible for the sweep gas to have substantially maximum contact with the permeate. Usually the sweep gas is at a pressure of between about 0.01 and 50 psia, preferably between about 1 and 25 psi.

In one embodiment of the present invention, the module is used in a system for the dialysis of a liquid stream, e.g., the treatment of blood containing harmful constituents which are normally removed in the urine. The module 10 of the invention has been modified to provide means for introducing a second, countercurrent flowing fluid stream (dialyzing solution) to one end of the module, together with means for removing the solution upon passage therethrough, now known as diffusate, from the other end of the module. The intrastructure of the module 10 may take the form of FIG. 3 wherein the second passageway 70 comprises the thin, connecting regions A, B and C. The dialyzing solution is introduced via a line 11 and an adapter collar 14 to one edge of the module 10, whence the dialyzing solution flows lengthwise of the module through the feed fluid passageway 70 to the other end of the module where it empties into a second collar member 14A from where it is removed in a line 13A. The dialyzing solution upon passage through the first passageway 70 and the acquiring of solutes through the membrane is commonly described in the art as diffusate. Typically, the flow path length of the dialyzing solution is the first passageway 60 is 18 inches to 40 inches (45 to 100 cm) compared with 10 feet to 20 feet (3 to 6 m) path length for the permeate passageway 60 through which the feed spirally flows. The feed (e.g., blood) upon coming into contact with membrane 24 is commonly referred to as dialysate and when it exits from pipe 15, it is referred to as dialysate and when it exists from the pipe, it is referred to as retentate. An outstanding advantage derived from the configuration of the module of the invention when used in dialysis is that the module allows for a long residence time for the feed (dialysate) and a high flow rate for the dialyzing solution because of the short path length of the permeate passageway 60. The high flow rate of the dialyzing solution through the permeate passageway 60, lengthwise of the module, tends to minimize concentration polarization of the solutes at the membrane surface, thereby promoting a higher transfer rate of solutes across the membrane.

Module 10 of FIG. 1 is suitable for reverse osmosis treatment of liquids and gas separations and in such operations, the second passageway 70 will desirably employ as shown in FIG. 1–5 a full width polymeric spacer. When operating at elevated pressure it is frequently desirable to employ spaced perforations or small diameter holes 18 for introduction of the fluid stream to the permeate passageway 70 of the leaf structure and to make a similar substitution for the slit 42. Reinforced module 10 when used for gas separation may be conveniently utilized in a pressurized system which employs an outer vessel or shell 90 to collect the concentrated feed 97A which is removed via a housing line 13A.

In one embodiment, the permeable membrane is a commercial NAFION ® a trademarked product of DuPont Co., Inc., of Wilmington, Del. The membrane can also be a perfluorosulfonic acid (PFSA) produced by the Dow Chemical Company, Midland, Mich.

The microporous membrane support material is a commercial VERSAPOR ® 3000H available from Gelman Sciences, Ann Arbor, Mich. or a polysulfone.

Other distributor spacer materials include commercial CONWED ® spacer materials from Rashell Fabrics.

The adhesive to adhere the edges of the membrane to create the permeate passageway and to adhere the separator layer to pipe 15 may be the same or different. A single epoxy adhesive FULLER FE-7621 A and B is available from H. P. Fuller Co., Chicago, Ill.

The permeate pipe 15B can be independently metal, organic polymer, composite and the like. Suitable materials include, for example, commercially available copper, steel, aluminum, poly(carbonate), poly(amide), poly(vinyl chloride), and the like. Copper or polyvinyl chloride are preferred.

The diameter of the permeate pipe is any effective size, e.g. from about 0.5 in. outer diameter to about 4 in. outer diameter. Preferably, the diameter is between about 0.5 in. and 2 in. outer diameter.

The length of the pipe is really not limited and can be from a few inches to several feet. Generally, the length is between about 6 in. to about 6 ft.

The permselective membrane can be of any material which is selectively permeable to the fluid or species to be separated. These membranes can be, for example, cellulose triacetate, polyperfluorosulfonic acid (PFSA), polyamide, polyvinylalcohol, polysulfone, regenerated cellulose or the like. Membranes include, for example, PFSA (See U.S. Pat. No. 4,846,977 for methods of preparation) assigned to Dow Chemical Company, Midland, Mich. 48640, or NAFION ® film from DuPont Co. of Wilmington, Delaware, or cellulose triacetate KODACELL ® TA-404 from Eastman Kodak, Rochester, N.Y. The thickness can be any useful thickness, preferably between 0.1 and 100 mil, more preferably about 1-5 mil.

Membranes that are suitable for use in the present invention may be constructed of a fluoro-carbon-type material or of a hydrocarbon-type material. Such membrane materials are well-known in the art. Preferably, however, fluorocarbon materials are generally preferred because of their chemical stability.

Non-ionic (thermoplastic) forms of perfluorinated polymers described in the following patents are particularly suitable for use in the present invention because they are easily softened by heating and formed into useful membrane shapes. Membranes which are suitable are described in the following U.S. Pat. Nos.: 3,282,875; 3,909,378; 4,025,405; 4,065,366; 4,116,888; 4,123,336; 4,126,588; 4,151,052; 4,176,215; 4,176,215; 4,192,725; 4,209,635; 4,212,713; 4,251,333; 4,270,996; 4,329,435; 4,330,654; 4,337,137; 4,337,211; 4,340,680; 4,357,218; 4,358,412; 4,358,545; 4,417,969; 4,462,877; 4,470,889; 4.478,695; and European Patent Application 0,027,009, all of which are specifically incorporated herein by reference. Such polymers usually have equivalent weight in the range of from about 500 to about 2000. The membranes can be of a single layer or they can be a multilayer membrane.

Particularly preferred fluorocarbon materials for use in forming membranes ar copolymers of monomer I with monomer II (as defined below). Optionally, a third type of monomer may be copolymerized with I and II.

The first type of monomer is represented by the general formula:

$$CF_2=CZZ' \qquad (I)$$

where:
Z and Z' are independently selected from the group consisting of —H, —Cl, —F, or —CF$_3$.

The second type of monomer consists of one or more monomers selected from compounds represented by the general formula:

$$Y-(CF_2)_a-(CFRf)_b-(CFRf')_c-O-\{CF(CF_2X)CF_2-O\}_n-CF=CF_2 \qquad (II)$$

where:
Y is selected from the group consisting of —SO$_2$Z, —CN, —COZ, and C(R$_3$f)(R$_4$f)OH;
Z is —I, —Br, —Cl, —F, —OR, or —NR1R2;
R is a branched or linear alkyl radical having from 1 to about 10 carbon atoms or an aryl radical;
R$_3$f and R$_4$f are each independently selected from the group consisting of perfluoroalkyl radicals having from 1 to about 10 carbon atoms;
R1 and R2 are independently selected from the group consisting of —H, a branched or linear alkyl radical having from 1 to about 10 carbon atoms or an aryl radical;
a is 0-6;
b is 0-6;
c is 0 or 1;
provided a+b+c is not equal to 0;
X is —Cl, —Br, —F, or mixtures thereof when n=1;
n is 0 to 6; and
Rf and Rf' are independently selected from the group consisting of —F, —Cl, perfluoroalkyl radicals having from 1 to about 10 carbon atoms and fluorochloroalkyl radicals having from 1 to about 10 carbon atoms. Particularly preferred is when Y is —SO$_2$F or —COOCH$_3$; n is 0 or 1; Rf and Rf' are —F; X is —Cl or —F; and a+b+c is 2 or 3.

The third, and optional, monomer suitable is one or more monomers selected from the compounds represented by the general formula:

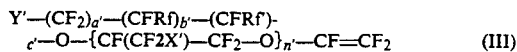
$$Y'-(CF_2)_{a'}-(CFRf)_{b'}-(CFRf')_{c'}-O-\{CF(CF2X')-CF_2-O\}_{n'}-CF=CF_2 \qquad (III)$$

where:
Y' is —F, —Cl or —Br;
a' and b' are independently 0-3;
O is 0 or 1;
provided a'+b'+c' is not equal to 0;
n' is 0-6;
Rf and Rf' are independently selected from the group consisting of —Br, —Cl, —F, perfluoroalkyl radicals having from about 1 to about 10 carbon atoms, and chloroperfluoroalkyl radicals having from 1 to about 10 carbon atoms; and
X' is —F, —Cl, —Br, or mixtures thereof when n'=1.

Conversion of Y to ion exchange groups is well-known in the art and consists of reaction with an alkaline solution. The membrane may be converted to its ionic form by reacting it with, in the case of —SO$_2$F pendant groups, 25 weight percent of NaOH under the following conditions:

1. immerse the film in about 25 weight percent sodium hydroxide for about 16 hours at a temperature of about 90° C; and
2. rinse the film twice in deionized water heated to about 90° C., using about 30 to about 60 minutes per rinse. The pendant group is then in the —SO$_3$—Na+ form. Cations other than —Na+ can be made to replace the Na+ if practical (such as —H+).

The feed or permeate spacer materials are generally porous loosely knit organic materials. These include, for example, VEXAR®, which is available from Conwed Corp., St. Paul, Minn. VEXAI® is useful as a permeate grid spacer at a pressure of up to about 30 psig. At high feed pressures (over 50 psig), the porous membrane usually collapses into the VEXAI®. At these higher pressures, SIMPLEX spacer available from Al DeCenso Fabrics, Annapolis, Md. 21401 is particularly useful as a permeate spacer.

The plug barriers 51C and 51D are independently selected from any materials which will seal the pipe into two compartments. Thus, for a copper or aluminum pipe, a copper or aluminum barrier may be soldered or welded in place. A polymeric material such as a polyurethane adhesive plug may be used. For the organic polymeric pipe, usually an organic adhesive sealant is used such as polyurethane, epoxide and the like. Dow Epoxy DER 410 or Fuller 3501 are particularly useful.

The adhesive sealant at the edges of the feed membrane is usually an organic adhesive, such as a commercially available polyurethane or epoxide, e.g. Fuller 3501 or Dow DER 410.

The barrier 57A and 57B provides maximum contact of the permeate and countercurrent fluid with the active membrane. The barrier (glue line) can be of polyurethane or an epoxide.

The module can be used at temperatures lower than 0° C. for the separation of gases (e.g., O$_2$/N$_2$, low boiling FREON®S, etc.). The only limitation is when the low temperature causes the polymer to degrade or imbrittle. The upper operational temperatures must be below the glass transition temperature of the polymers and membranes, usually 10° C. lower or more.

The modules usual operate for air or natural gas dehydration at between about 0° C. and about 70° C. Ambient temperatures are preferred.

With any of the modules described herein, multiple leaf arrangements are contemplated. At least one permeate spacer-membrane-feed spacer-membrane arrangement is present.

FIGS. 11 to 12, etc. show the use of the sweep gas passing through the permeate passageway. The present invention makes it possible for the sweep gas to have maximum contact with the permeate. Usually the sweep gas is at a pressure of between about 0.01 and 50 psia, preferably between about 1 and 25 psia.

The microporous membrane support material is a commercial VESAPOR ® 3000H both available from Gelman, Ann Arbor, Mich. or a commercially available polysulfone. VEXAR ® is also available from Conwed Corp. Also see F. B. Mercer, U.K. Patent No. 836,555. Other feed spacer materials include nylon, polysulfone and the like.

The permeate sweep spacer material 58 (FIG. 4A or 4C) is epoxy-coated simplex spacer Simplex (or SIMPLEX ®) is an epoxy-coated simplex polyester fabric. A preferred spacer is available as simplex type S46E as epoxy (Hornwood Epoxy type HC-80) coated polyester in style numbers 7921, 9628, 9661, 9771 and 1271 commercially available from A. DiCenso Textiles, Inc., Annapolis, Md. 21401. This spacer is also used in reverse osmosis filtration cartridges.

The differential flow in the permeate (or feed passageway) may be obtained using multiple layers of spacer material. For instance, the distributor spacer material (Regions A and C, FIG. 3B) may be VEXAR ® 5321 in single or optionally multiple layers of spacer material (to make this region more porous) than are used in the active permeate spacer region B. Region A-B-C may also be one spacer grid material of substantially uniform porosity.

Other distributor spacer materials in the feed or permeate passageway include commercial CONWED ® spacer materials from CONWED ® Corp.

The adhesive to adhere the edges of the membrane to create the permeate passageway and to adhere the separator layer to pipe 51B may be the same or different. A single epoxy adhesive FULLER FE-7621 A and B is available from H. P. Fuller Co., Chicago, Ill.

The module can also be used to remove heavier hydrocarbons (C-2 to C-10 or greater) from natural gas using a membrane which is selective to these hydrocarbons or to methane. Silicone membranes are useful in this separation process which is commonly known as hydrocarbon dew pointing.

The module can also be used to remove heavier hydrocarbons (C-2 to C-10 or greater) from natural gas using a membrane which is selective to these hydrocarbons or to methane. Silicone membranes are useful in this separation process which is commonly known as hydrocarbon de pointing.

It is understood that the present invention is described in terms of sweep fluid being countercurrent, crosscurrent or cocurrent. Countercurrent sweep flow is usually preferred. Of course, the direction of sweep fluid and of feed fluid can each be independently reversed in the present invention with achievement of essentially the same good separation results.

Permeate Channels of Barrier (Glue) Lines

As is evident from the description herein, control of the flow of a countercurrent cocurrent or crosscurrent sweep fluid in the permeate passageway of the module can be achieved in a number of ways.

Additional module configurations use relatively thin barrier lines (adhesive, polymer, glue, ceramic, etc.) which are strategically placed within the permeate passageway. Of course, the feed passageway can also be formed using strategically placed thin barrier (polymer) lines. The main requirement is that the flow through the feed passageway be substantially uniform per unit area and also maximize contact of the feed with the semipermeable membrane. Similarly, flow through the permeate/sweep passageway should maximize contact with the semi-permeable membrane. FIGS. 14 to 25 show various useful configurations of barrier (polymer) lines.

Figure 14:
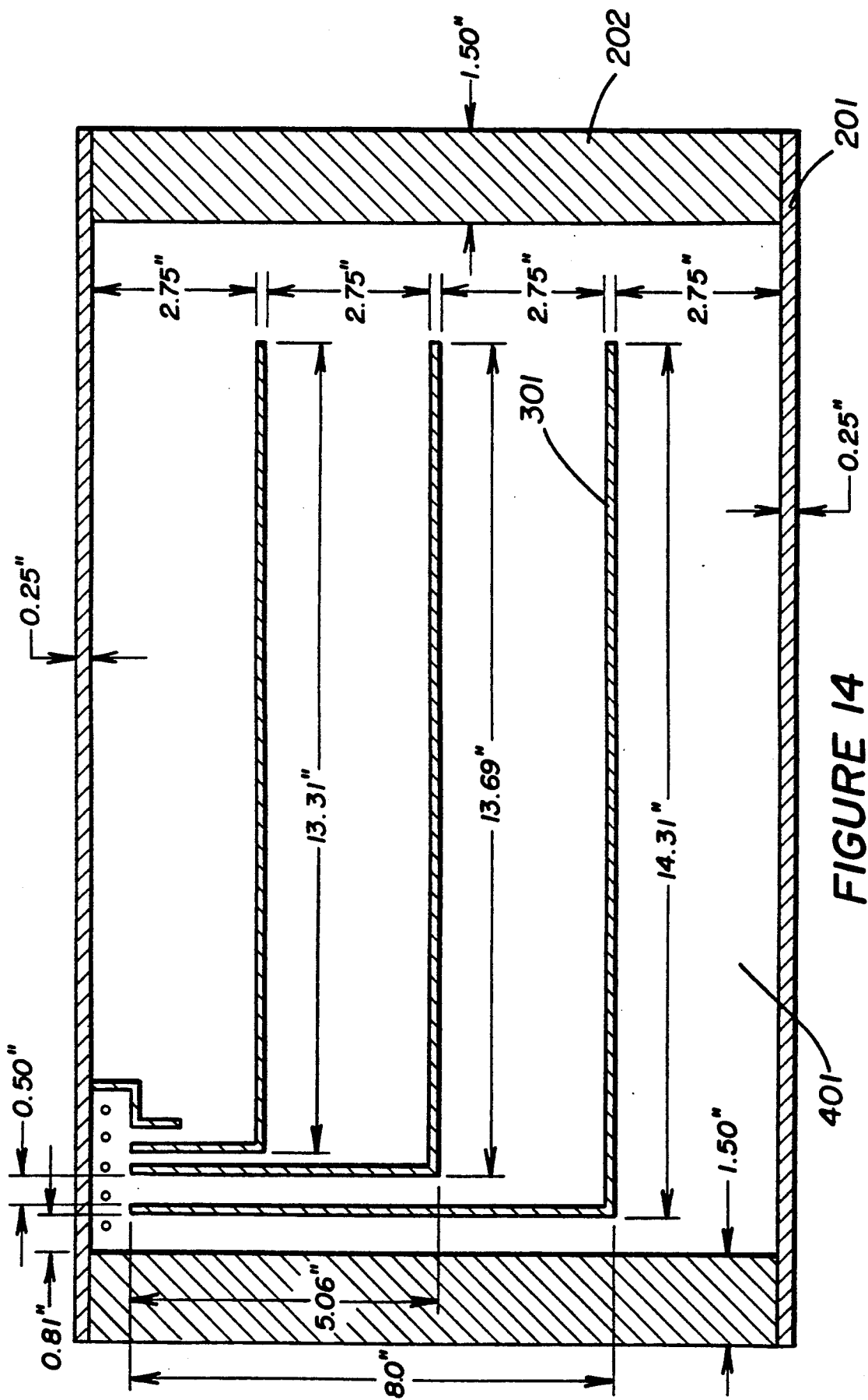
FIG. 14 is a top plan cutaway view of one embodiment of the unwrapped permeate passageway having a countercurrent or cocurrent sweep fluid reservoir in one corner and specially placed barrier (polymer) lines.
Figure 15:
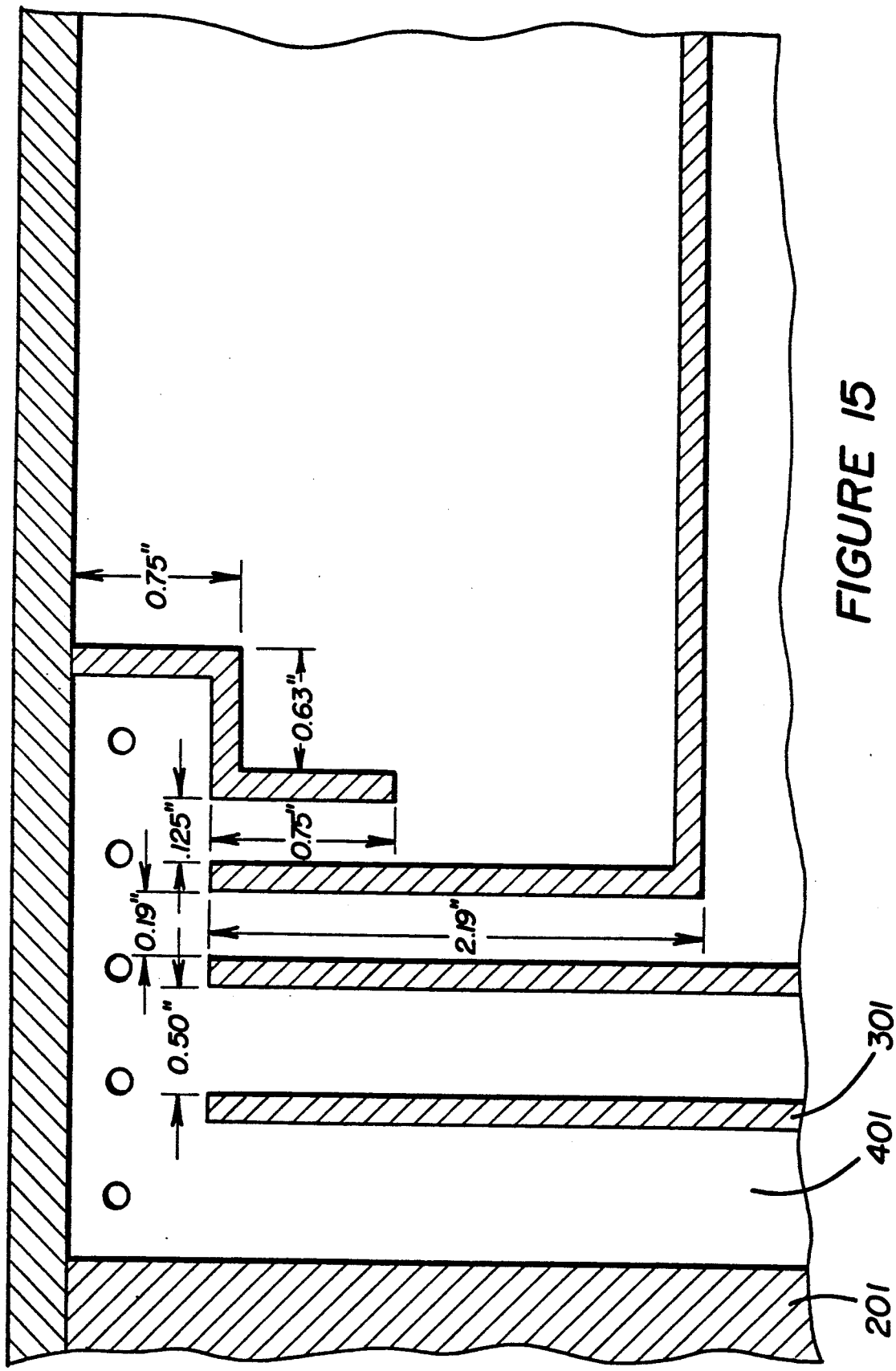
FIG. 15 is an enlarged view having dimensions for one embodiment of the countercurrent or cocurrent sweep fluid reservoir of FIG. 14.
Figure 16:
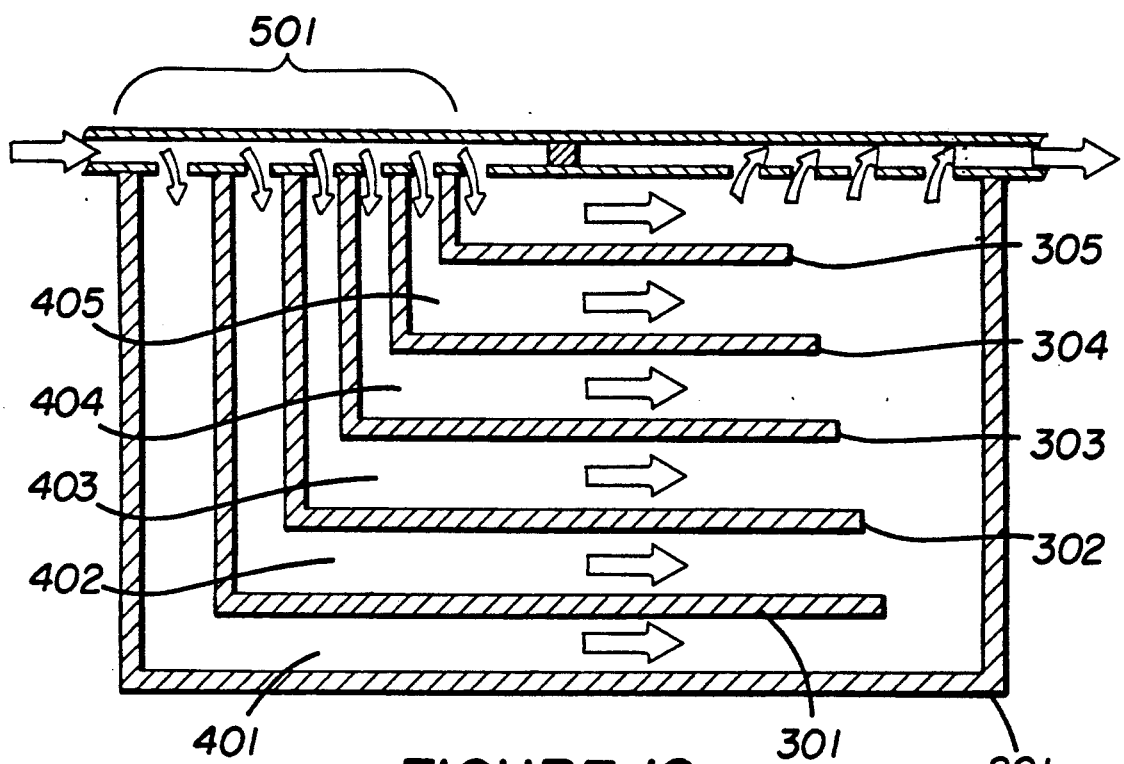
FIG. 16 is a top plan cutaway view of one embodiment of the unwound permeate passageway having a countercurrent sweep fluid and barrier (polymer) lines having 90° angles.
Figure 17:
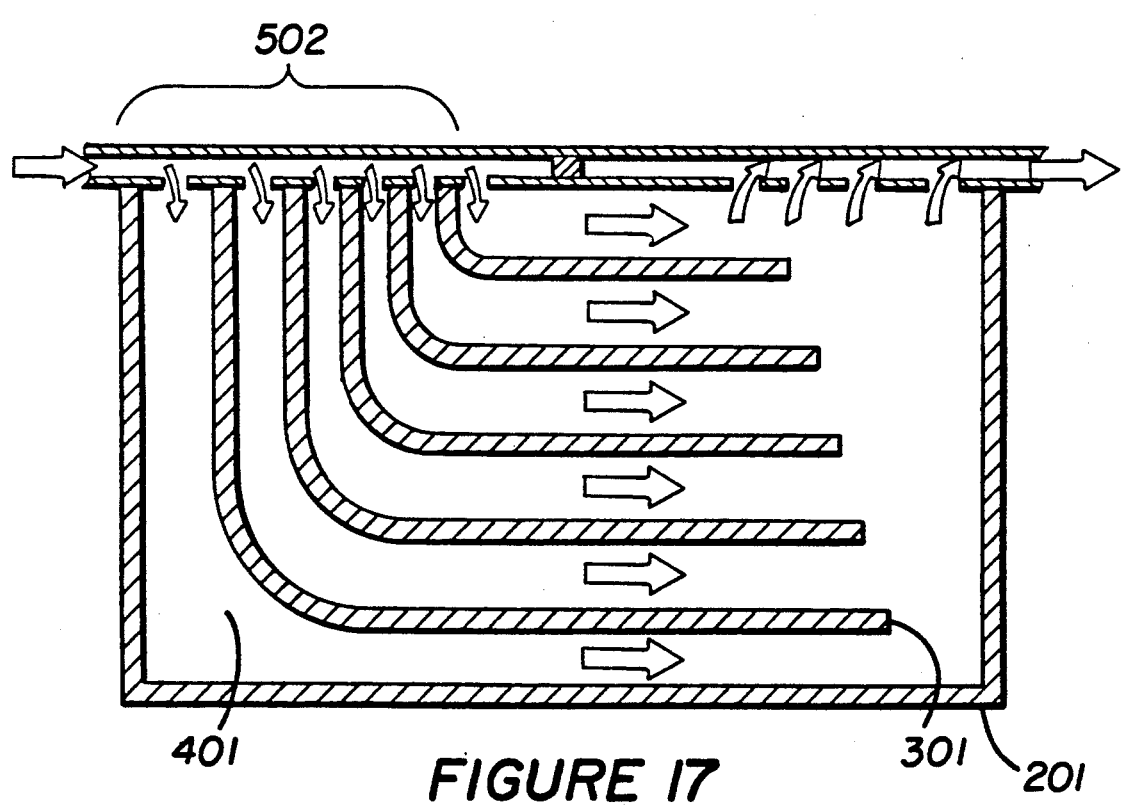
FIG. 17 is a top plan cutaway view of one embodiment of the unwound permeate passageway having a countercurrent sweep fluid and barrier (polymer) lines at a 90° angle having rounded corners.
Figure 18:
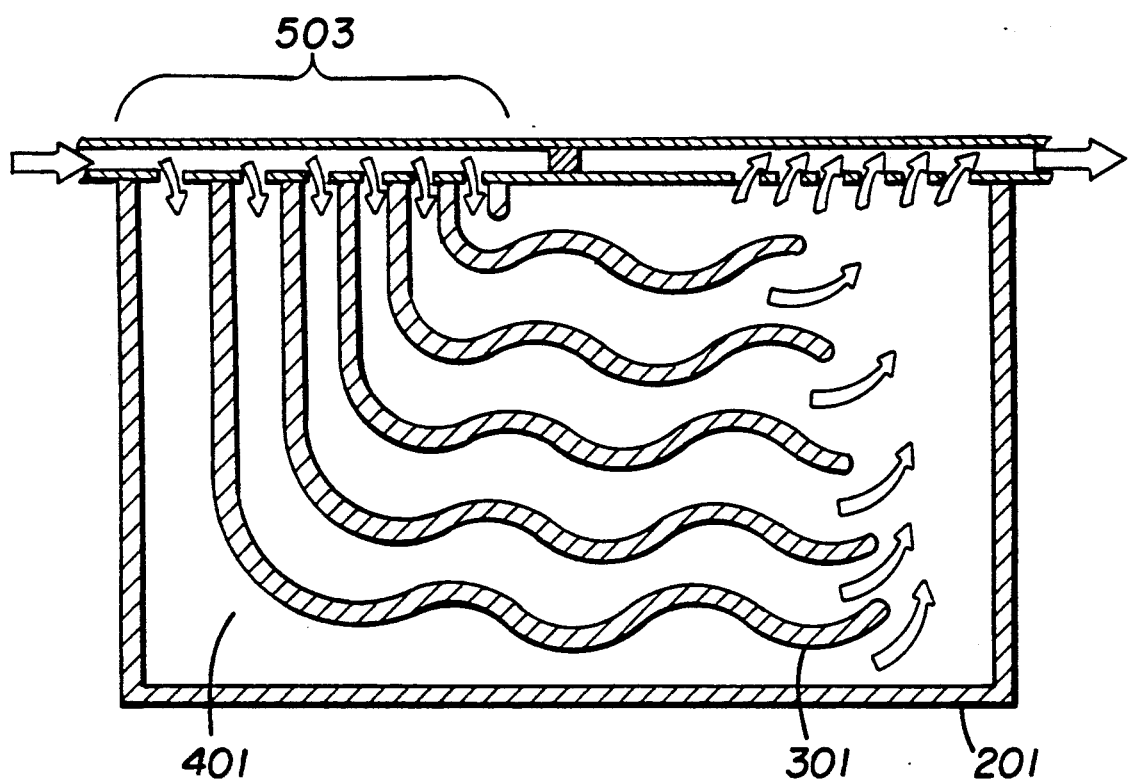
FIG. 18 a top plan cutaway view of one embodiment of the unwound permeate passageway having substantially radial solid lives (to the central pipe) and rounded and waving lines of barrier (polymer) substantially parallel to the axis of the pipe.
Figure 19:
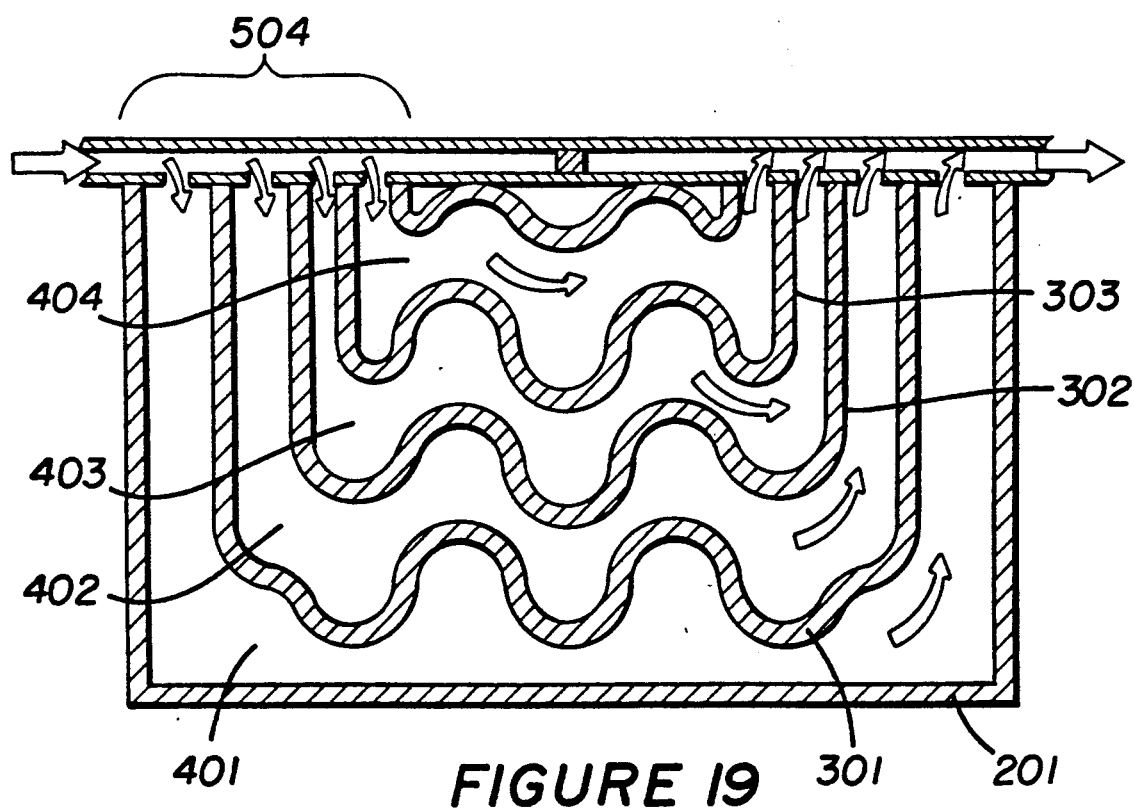
FIG. 19 is a top plan cutaway view of the one embodiment of unwound permeate passageway having channels defined by straight and curved lines of barrier (polymer).
Figure 20:
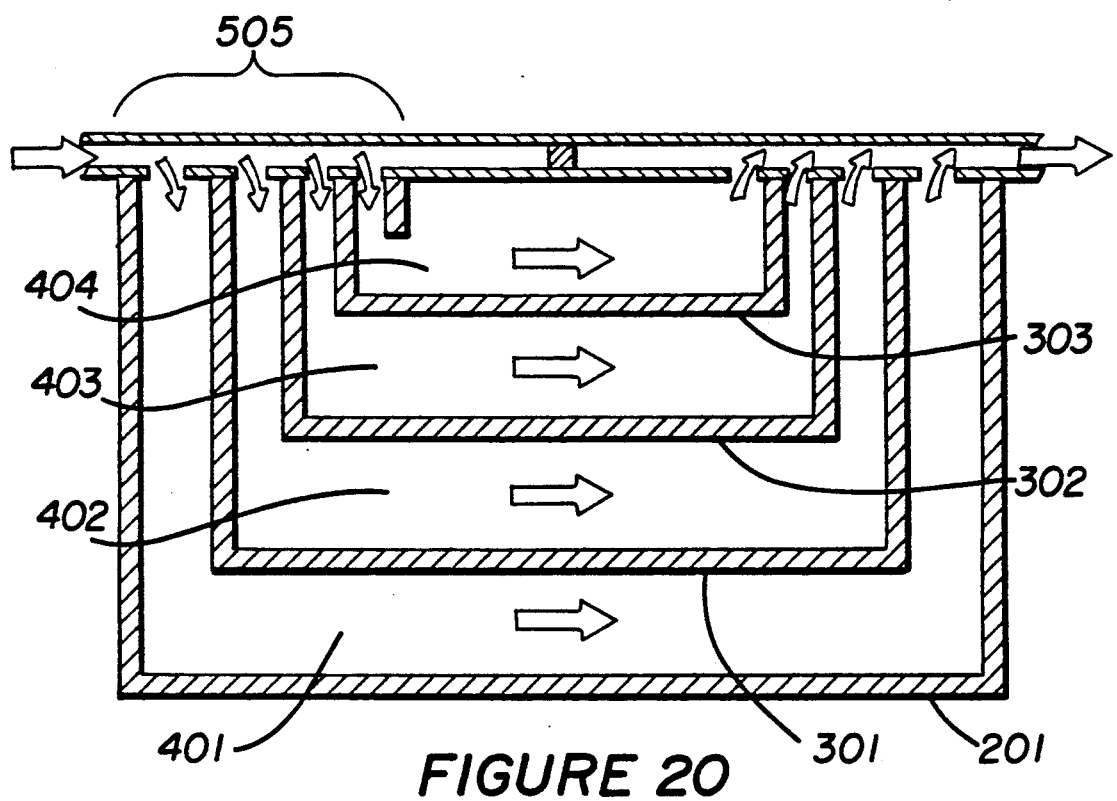
FIG. 20 is a top plan cutaway view of one embodiment of the unwound permeate passageway having defined channels created by substantially perpendicular and parallel barrier (polymer) lines of polymer creating defined fluid channels.
Figure 21:
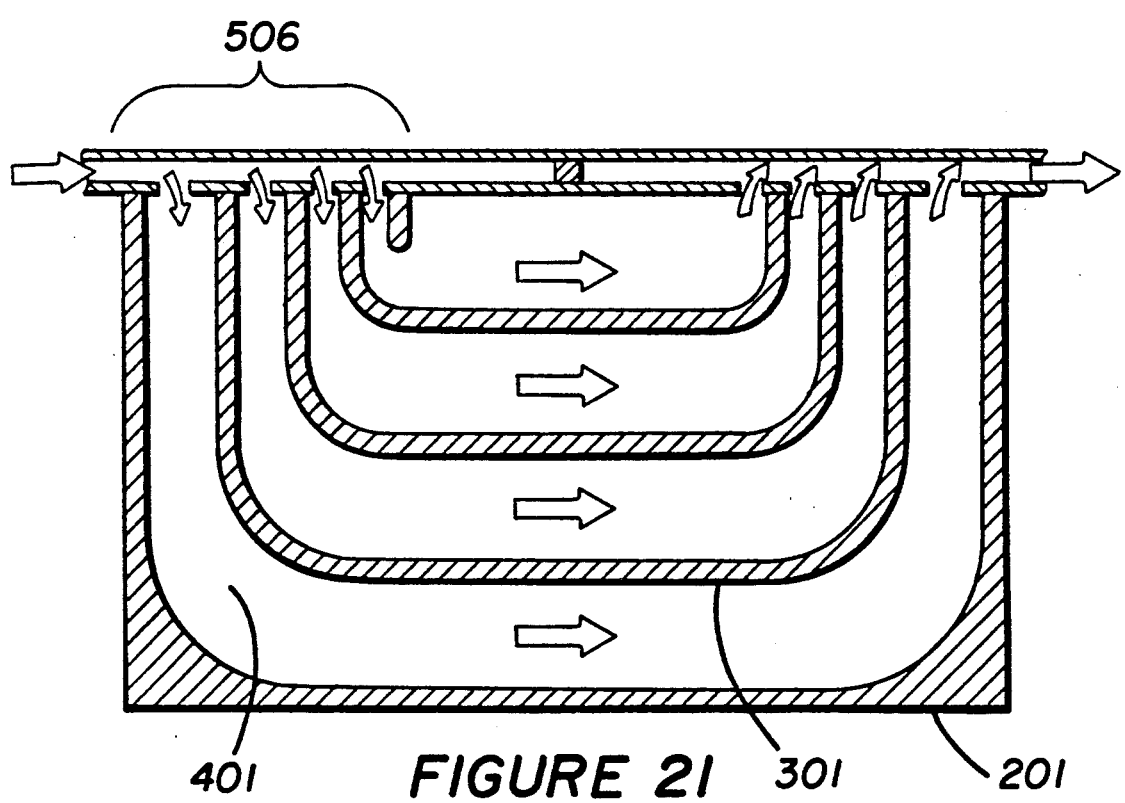
FIG. 21 is a top plan cutaway view of one embodiment of the unwound permeate passageway of FIG. 20 wherein the right angles of the barrier (polymer) lines are rounded creating defined fluid channels.
Figure 22:
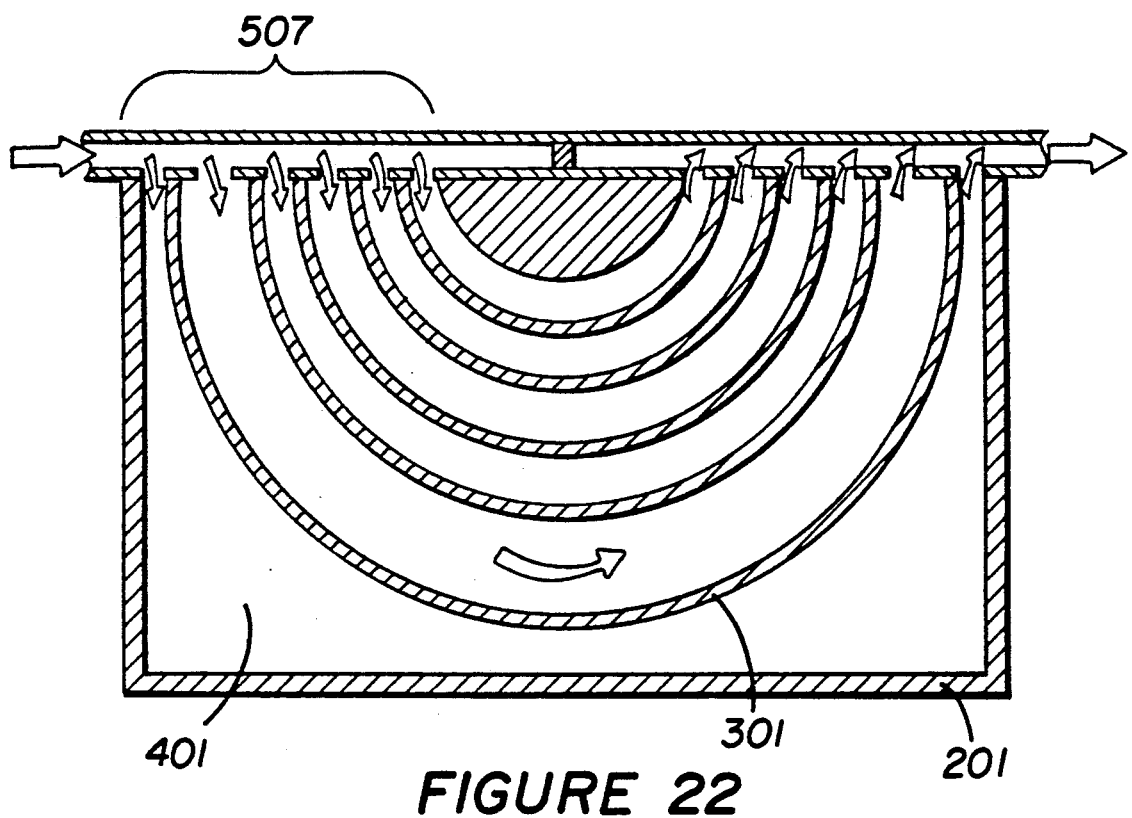
FIG. 22 is a top plan cutaway view of one embodiment of the unwound permeate passageway having substantially semicircular channels created by barrier (polymer) lines terminating at the central pipe.

FIG. 14 is shown one configuration having an L-shaped pattern. FIG. 15 is an enlargement of a small reservoir into which the sweep fluid flows before distribution and traversing the remainder of the permeate passageway.

Edge sealant 201, or 202 or barrier 301 (302 ff) can be of the same or different barrier materials. Preferably materials include organic polymers, such as epoxys, polyurethanes or silicones. Space 401 (402 ff) is one created channel in the permeate passageway.

The key requirement is to obtain substantially uniform flow per unit area through the channels created. The optimum channel dimensions for a given number of barrier lines ca be calculated using the mathematical formula for pressure drop (PD). See FIG. 25, which is not drawn to scale.

$$(PD)_1 = k_A(L_A/W_A)_1 + k_B(L_B/W_B)_1 + k_C(L_C/W_C)_1$$

$$(PD)_2 = k_A(L_A/W_A)_2 + k_B(L_B/W_B)_2 + k_C(L_C/W_C)_2$$

$$(PD)_n = k_A(L_A/W_A)_n + k_B(L_B/W_B)_n + k_C(L_C/W_C)_n$$

Figure 25:
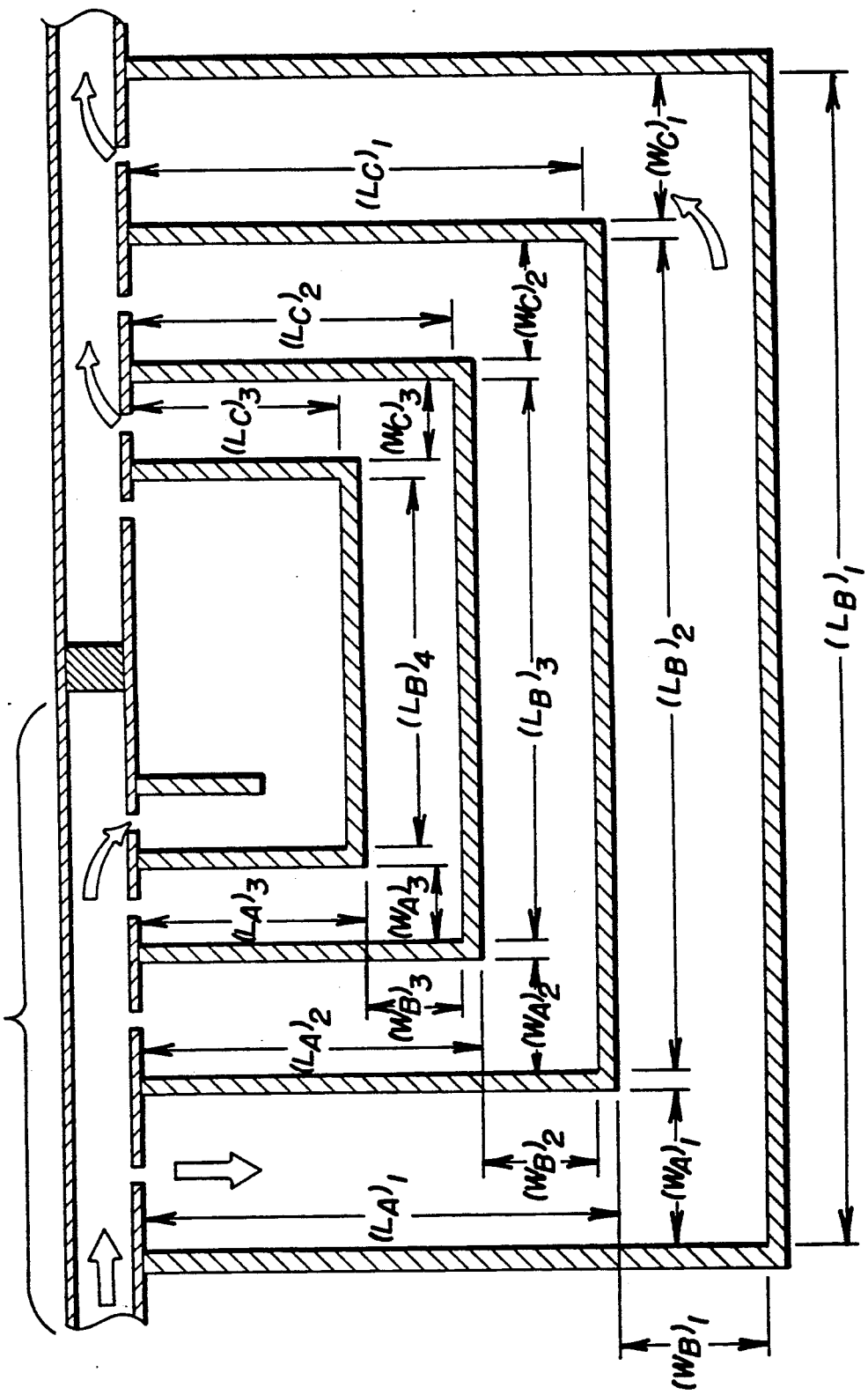
FIG. 25 shows the general dimensions and parameters for calculating a configuration to produce substantially uniform rates of flow of the sweep fluid through the permeate passageway.

As is shown in FIG. 25:

$W_A$ is defined as the width of the channel immediately adjacent to the corner reservoir and outer edge of the permeate passageway.

$L_A$ is as defined the length of the first barrier line extending radially from the central pipe.

$W_B$ is defined as the width of the channel at a location furthest remote location from the pipe, and generally radial to the pipe.

$L_B$ is defined as the length of the channel at a location furthest remote from the pipe and generally parallel to the pipe.

$W_C$ is defined as the width of the channel which is remote from the reservoir (if present) and is generally parallel to the pipe.

$L_C$ is defined as the length of the first barrier line extending generally radially from the central pipe.

$k_A$, $k_B$, $k_C$ etc. are permeability coefficients of the spaces which can be determined experimentally by conventional means.

The subscripts 1, 2, 3, etc. indicate the particular channel dimensions being determined.

In FIGS. 14, 15, 24 and 25 the dimensions and positioning of the barrier lines are important. For the shown 2 sq. ft. module, these dimensions are shown in the Figures, as a preferred embodiment. The dimension limitations are included to describe embodiments and are not to be considered limiting in any way.

For the other channels, similar definitions and numbers are used. Computer assisted evaluation and simulation can be used to equalize $(PD)_1 = (PD)_2 = \ldots (PD)_n$ by varing $(L_A)$, $(W_A)$, $(L_B)$, $(W_B)$, $(L_C)$ and $(W_C)$ etc. in different channels.

One L-shaped line is a minimum channel. Three to seven L-shaped lines are preferred.

The thin membranes are selected from those described herein. PFSA, NAFION ® or cellulose triacetate are preferred, when using these modules for gas dehydration applications. Other membranes commonly known in the art can be used for other applications.

The permeate spacer is selected from those described herein. Simplex is preferred.

The barrier lines are as thin as is practical to maximize the active surface area of the permselective membrane. The polymer is selected from those described herein. The polymer when cured should be slightly flexible and compressible. Epoxys, polyurethanes or silicones are preferred.

In one fabrication, the permeate spacer (e.g., simplex, 2 sq. ft.) is usually placed on a flat glass plate. The thin urethane barrier lines are placed on the simplex, and a second glass plate is placed on top of the simplex to form a sandwich structure. The urethane is cured, and the glass plates are removed.

The flexible polymer (the barrier) lined spacer is then placed between the surfaces of adjacent membranes to form the permeate passageway.

Figure 23:
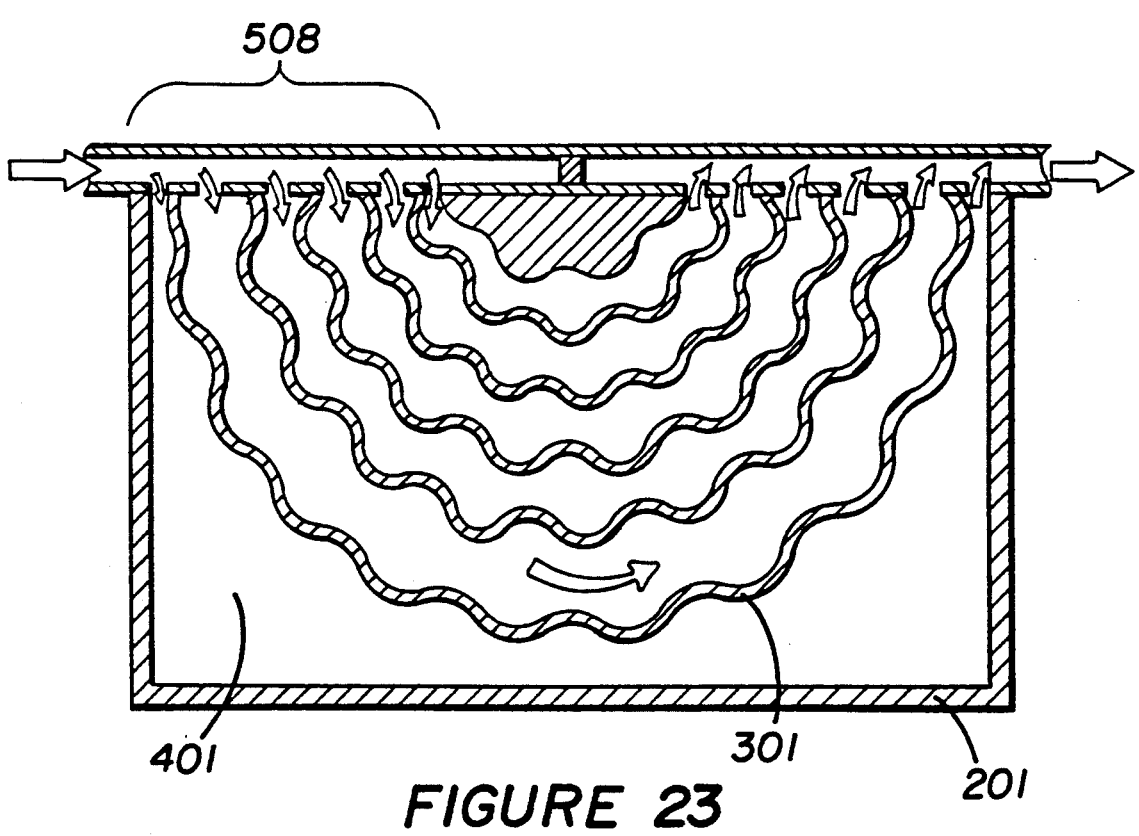
FIG. 23 is a top plan cutaway view of one embodiment of the unwound permeate passageway having substantially multiple random multiple curved barrier (polymer) lines in an overall semicircular pattern creating channels which terminate at the centrally located pipe.

FIGS. 16-23 show other variations of thin barrier (polymer) line embodiments. FIG. 23 having the wavy lines is useful in that some turbulence and/or mixing (and therefore more efficient contact with the permselective membrane) is created in the permeate passageway.

In FIGS. 16-25, the barrier line(s) is designated as 301 and the passageway(s) formed are designated as 40 (generally as shown in FIGS. 14 and 15). Line 201 is generally the seal (adhesive) at the exterior edge of the permeate passageway (membrane).

Regions 501, 502, 503, 504, 505, 506, 507 and 508 for FIGS. 16-23 are to indicate that the holes in the pipe may also open to a reservoir as found in FIG. 14.

FIGS. 24 and 25 show the dimensions for one preferred embodiment of the present invention, when combined with FIGS. 14 and 15. In FIG. 25 the initial distribution of the sweep fluid at Region 501 can be accomplished by using the reservoir embodiment described herein.

In one embodiment, the adhesive barrier pattern in the permeate spacer to produce the defined permeate passageway is achieved by separately and carefully melting specific lines of the spacer (preferably an organic polymer). The patterned spacer is then inserted into the permselective membrane as described above. The flexible permselective membrane under the autogenic pressure of the fluid separation process pressing against the barrier lines produces the permeate channels.

The following Examples are meant to be descriptive and illustrative only. They are not to be construed as being limiting in any way.

EXAMPLE 1

Module Fabrication

A 12"×12" cellulose triacetate (CTA) film (Eastman Kodak see above) was hydrolyzed with sodium hydroxide, washed thoroughly with water, and dried. A 20" long polycarbonate tube with ⅜" O.D. was modified as follows. A hole was drilled in the middle and filled with polyurethane adhesive to create a plug. After curing overnight, holes were drilled in the pipe as shown in FIG. 13.

Figure 9:
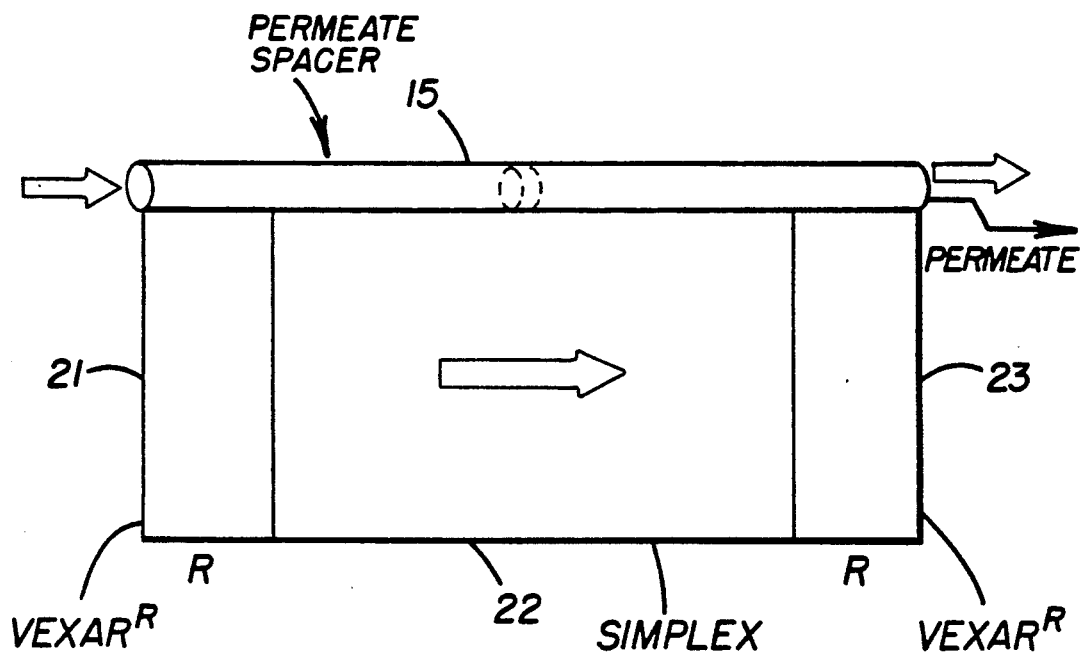
FIG. 9 shows a plan top view of the permeate spacer design using VEXAI ® and simplex before spiral winding.

To obtain the spacer combinations as described above, the dense spacer used was the permeate spacer (epoxy filled SIMPLEX ® material) and the open spacer used was VEXAR ® #5321. The same open spacer was also used as the feed spacer. Spacers were cut as follows:

(1) Three dense spacers 6"×5" Permeate
(2) Two open spacers 3"×5" Permeate
(3) One open spacer 12"×5" Feed In this example only two dense spacers in permeate passageway 60 occupied the region marked "B" in FIG. 9. The spacers were first attached to the pipe with urethane adhesive and then the CTA film was attached around the pipe with urethane adhesive in the middle of the film. After curing the adhesive, the feed spacer was inserted, and the module was wound tightly around the tube. During the winding process urethane adhesive was applied all along the edges of the permeate spacers and the membrane to seal the permeate channel. A thin coating of urethane adhesive was applied all around the wound module and allowed to cure. Care was taken not to apply adhesive at the two open ends of the module.

This module was then inserted into the pressure chamber such that the hollow aluminum tube extends out of the pressure chamber through sealed couplings at both ends. The pressure chamber was then pressured, and the pressure slowly increased to 1000 psi. Even at these high pressures, no gas leaked through the aluminum tube enclosed in the permeate channel. A measured flow rate of nitrogen gas at pressures below 10 psig was introduced through the permeate channel of the module through one end of the polycarbonate tube and the pressure drop across this permeate channel measured as a function of the feed pressure. As expected, at higher feed pressures there was higher pressure drop in the sweep channel. Pressure drop at a given feed pressure can be controlled by varying dimensions of the sweep channel.

EXAMPLE 2

Air Dehydration

A module was prepared using PFSA membrane, 4 mils in thickness, from Dow Chemical, and spacers of VEXAR ® and SIMPLEX ®. The schematic design is found in FIG. 9. The temperature of operation was 23° C.

This module was constructed about a hollow aluminum pipe of about ⅜ in diameter. See FIG. 1. The membrane was PFSA (Dow Chemical). 4 mil and a surface area of 2 sq ft. A fiber reinforced acrylic microporous membrane (GELMAN ® 3000H) 7 mil thickness with 3-micron pores was used as an additional membrane support between the membrane and the permeate (sweep) spacer.

The module was leak tested at 500 psi, tested for air dehydration at 100 psi, and tested for dehydration of CH$_4$/CO$_2$ at 490 psi under field conditions.

The design used in this module was a combination of SIMPLEX ® and VEXAR ® spacers to create counter-current flow on the sweep side of the membrane. The SIMPLEX ® spacer is a fabric woven from epoxy coated polyester fiber. The spacer is 16 mil thick and has flow channels on both surfaces. The flow channel dimensions of the spacer vary from 100-600 microns. The VEXAR ® spacer is more open mesh made with polypropylene fibers. The VEXAR ® spacer acts as the distributor for the sweep gas while the SIMPLEX ® spacer provides the active counter-current contact area. This module did not develop any leak when tested at 500 psi using dry nitrogen gas for one hr. Air dehydration performance measured at 100 psi is given in Table 1 below. This module was tested for dehydration of natural gas (50/50 CH$_4$/CO$_2$) for 5 weeks at 490 psi. Dehydration performance data obtained is also given in Table 1. The module did not develop any leaks during the entire duration of field testing. However, its dehydration performance was not good over time. Examination of the module revealed that the VEXAR ® spacer collapsed under high pressure causing flow distribution problems in the sweep channel which resulted in the poor dehydration performance of the module. Further studies using a Plate & Frame device also confirmed that the VEXAR ® spacer actually has higher pressure drop than the SIMPLEX ® spacer above 300 psi. The visual examination clearly indicated that the VEXAR ® spacer collapsed under high pressures, and that the collapse was irreversible.

The spiral wound module design is modified to avoid distributor spacer collapse problems. A single SIMPLEX ® spacer is used in the modified design to create counter-current flow on the permeate sweep side of the membrane. The VEXAR ® collapse can also be avoided if instead of polyethylene, a spacer of polyester or other high compressive strength polymer, ceramic or metal is used.

TABLE 1

|   | Feed Press (Psig) | Feed Flow (SLPM)* | Sweep Flow (% of feed flow) | Water Removal (%) |
|---|---|---|---|---|
|   | Air (saturated with water about 90%) | | | |
| 1 | 100 | 25.3 | 17 | 91 |
|   | Methane/Carbon dioxide (50/50, v/v) (Saturated with water) | | | |
| 2 | 490 | 30.6 | 8.8 | 76 |
| 3 | 490 | 29.8 | 4.5 | 62 |

*SLPM is standard liters per minute. The higher the rate of the counter-current sweep gas in the permeate passageway, the higher the percentage of water removal.

EXAMPLE 3

Air Dehydration

The module was prepared using 3 Mil film of PFSA (Dow Chemical) surface area of 0.25 sq. ft. and tested at 104 and 600 psi for air dehydration. See FIG. 10 for the spacing of the adhesive spots. The permeate spacer was SIMPLEX ® having a thickness of 16 mil. The feed spacer was VEXAR ® having a thickness of 24 mil. Air dehydration performance measured at 104 and 600 psi is given in Table 2. The module shows excellent dehydration performance. Dehydration efficiency of the module did not decrease at high pressures clearly indicating that the sweep spacer in the modified design did not collapse at 600 psi causing flow distribution problems in the sweep channel.

TABLE 2*

| Exp. No. | Feed Flow (SLPM) | Sweep Flow (SLPM) | Sweep (% of Feed) | Sweep Press (PSIG) | Inlet Humidity (%) | Water Removal |
|---|---|---|---|---|---|---|
| 1 | 12.0 | 0.27 | 2.3 | 0.7 | 97 | 77.5 |
| 2 | 12.0 | 0.41 | 3.4 | 1.2 | 97 | 88.2 |
| 3 | 12.3 | 0.51 | 4.1 | 1.6 | 90 | 92.5 |
| 4 | 12.3 | 0.51 | 3.7 | 0.6 | 90 | 92.5 |
| 5 | 18.0 | 0.70 | 3.9 | 2.3 | 93 | 91.5 |
| 6 | 28.3 | 1.18 | 4.2 | 3.8 | 93 | 90.5 |
| 7 | 5.0 | — | 10 | — | — | 75.5 |
| 8 | 3.8 | — | 13.2 | — | — | 88.1 |
| 9 | 3.3 | — | 23.6 | — | — | 93.8 |

*Exp. No. 1-6 at 600 psig feed pressure
Exp. No. 7-9 at 104 psig feed pressure

EXAMPLE 4

Dehydration of Methane

The module of Example 2 was used in this series to remove water from methane. The results are shown in Table 3 below.

TABLE 3

| Methane Gas Dehydration* 25° C. | | | | |
|---|---|---|---|---|
| Feed PSIA | Feed Flow (SLPM) | Sweep PSIA | Sweep Flow (% of feed) | Water Removal (%) |
| 300 | 2.8 | 23 | 8 | 94 |
| 600 | 10 | 22 | 3.8 | 93 |

The methane feed is saturated with water vapor about 90%.

EXAMPLE 5

Manufacture of Module with Barrier Lines of Polymer in the Permeate Passageway

A 20"×14" permeate spacer (of simplex) with the L-shaped lines (refer to FIGS. 14 and 15) was attached to the core pipe such that the holes in the inlet end of the pipe lie in the distributor portion of the L-shaped lines of polymer. The positioning is extremely important. If the holes are placed in the L-shaped area, then the flow distribution will not be uniform. As shown in FIG. 24, the holes in the inlet end of the core pipe should be in a small defined section of the circumference of the core pipe. At the exit end of the core pipe, the holes are around the entire circumference of the pipe.

The simplex spacer and core pipe assembly is used with a PFSA (3 mil) membrane to produce a 2 sq. ft. module having of active membrane surface. A Gelman (Versapor 3000 H) support membrane was used. The adhesive polymer used was 7621 epoxy from H. P. Fuller.

EXAMPLE 6

Dehydration of Moist Air

Air which is saturated with water (Dew point +22° C.) is passed through this 21 module defined by FIGS. 14, 15, 24 and 25.

TABLE 4
AIR DEHYDRATION DATA

| Run | Feed Flow (5 lpm) | Sweep Flow (5 lpm) | Rejected Dew Pt. (°C.)* | H₂O Remove (%) |
|---|---|---|---|---|
| 1 | 21.5 | 5.6 | −32+ | 98.8 |
| 2 | 20 | 4.2 | −32+ | 98.8 |
| 3 | 33 | 6.2 | −17.5 | 95.2 |
| 4 | 29 | 7.5 | −19.8 | 96.0 |
| 5 | 46 | 9.0 | −10.6 | 90.7 |
| 6 | 47 | 12.2 | −15.6 | 94.1 |
| 7 | 60 | 11.8 | −6.4 | 86.5 |

*Dew point measurements below −30° C. are not very reliable with present equipment.

Feed Dew point for all runs uses 22° C.

While only a few embodiments of the invention have been shown and described herein, it will become apparent to those skilled in the art that various modifications and changes can be made in a module having an improved design wherein the permeable membrane passageway has a central low porosity region having opposed high porosity edge regions to facilitate the dispersion and collection of the fluid being treated. Further, in one preferred embodiment, the module has means to introduce and exit a countercurrent, crosscurrent or concurrent sweep gas through the permeate. All the modifications can be made without departing from the spirit and scope of the present invention. All such modifications and changes coming within the scope of the appended claims are intended to be carried out thereby.

We claim:

1. A spiral wound membrane module having a semipermeable membrane for use in a housing in the separation of a fluid permeate from a fluid feed mixture, said module comprising
    a centrally located hollow pipe,
    at least one unsealed membrane envelope enclosing means to provide substantially uniform flow in the feed passageway,
    at least one fluid feed spacer, and
    at least one permeate spacer means for providing substantially uniform flow of the permeate in the permeate passageway, wherein said permeate passageway includes,
    flow control means for enabling crosscurrent, countercurrent or cocurrent sweep fluid flow in the permeate passageway,
    said generally hollow pipe having a wall barrier intermediate in its length dividing the pipe into a first compartment and a second compartment, said pipe having means for collecting a fluid permeate stream from the first compartment of said pipe and means for collecting and removing the permeate fluid stream from the second compartment of the pipe, said first and second pipe compartments each having at least one radial opening through the pipe circumference through which permeate fluid will pass,
    said porous sheet permeate spacer means are in fluid communication with the radial fluid openings of the first and second pipe compartments,
    said at least one membrane envelope comprises a sheet membrane creating a feed passageway having a first surface and a second surface opposite to the first surface wherein the membrane is folded at least once or sealed so that first one-half of the first surface of the membrane layer faces the other one-half of the first surface of the membrane envelope and interposed between the first and second surfaces of the first membrane is said porous sheet fluid feed spacer means,
    said permeate passageway for the fluid permeate is formed by the adjacent membrane surfaces opposite to the first surface, wherein the adjacent surfaces opposite to the first surface are sealingly adhered to each other having spacer means in the permeate passageway between the adjacent membrane envelope surfaces opposite the first surface,
    means for removal of permeate fluid from the permeate fluid passageway to the exterior of the module, and
    means for restraining the unspiraling of the compact module roll under operational conditions.

2. The spiral wound membrane module of claim 1 wherein
    said permeate spacer means comprises three juxtapositioned interconnected regions A-B-C wherein the outer higher porosity region A and outer higher porosity region C are each connected on one edge to, and are in fluid communication with, the pipe radial openings and a second axial side of region A and a second axial side of region C are each connected to opposing sides of lower porosity region B, wherein at the edge of region A which is generally radial to the pipe receives the permeate fluid which is in fluid communication with the intermediate pressure region B in fluid communication with lower pressure region C wherein region B is not directly in fluid communication with any radial opening of the first and second compartments of the pipe.

3. The spiral wound membrane of claim 1 wherein
    said permeate passageway comprises open defined channels which are in fluid communication with a fluid reservoir located at the corner of the membrane envelope immediately adjacent to the end of the pipe wherein the sweep fluid enters the pipe and permeate passageway.

4. The module of claim 1 wherein said hollow pipe further includes means for injecting countercurrent sweep fluid in one compartment of the pipe wherein the permeate stream is removed passing through the permeate passageway; and
    means for removing the countercurrent sweep fluid from the other compartment of the pipe.

5. The module of claim 2 wherein said module includes means for injecting cocurrent or crosscurrent sweep fluid into one end of the permeate passageway, and means for removing the cocurrent or crosscurrent sweep fluid from the other end of the permeate passageway.

6. The module of claim 1 wherein the high porosity region A and high porosity region C comprise at least one low density spacer means, and
    low porosity region B comprises at least one high density spacer means.

7. The module of claim 6 wherein high porosity regions A and B and low porosity region C are formed as an integral unit.

8. The module of claim 1 wherein the permselective membrane material is selected from cellulose triacetate, perfluoroethylene sulfonic acid polymer, or NAFION ®.

9. The module of claim 8 wherein the high density spacer is epoxy-coated simplex fabric polyester mesh material.

10. The module of claim 9 wherein the low density spacer is polypropylene mesh VEXAR® 5321.

11. The module of claim 10 wherein the pipe is independently selected from aluminium, polycarbonate, glass, copper, or polyvinylchloride.

12. The module of claim 1 wherein high porous region A is separated from low porosity region B, and low porosity region B is also separated from high porosity region C by two lines of spaced barrier spots in a predetermined configuration each in a substantially radial orientation relative to the pipe.

13. The spiral wound membrane separation module of claim 1 wherein
in said feed channel within the module the feed spacer means to control the flow of the feed comprises two juxtapositioned regions G and H wherein region G and region H are in fluid communication with each other and are separated by a series of adhesive spots in a predetermined configuration generally in a straight line generally parallel to the curved surface of the pipe and the entrance of said feed channel is a small opening radial to and immediately adjacent to said pipe into region G and the remaining about 80-90% of the feed entrance edge of the module is sealed, and
the exit of said feed channel is a small radial opening immediately adjacent to the parallel edge of the membrane sheet away from said pipe, and
in said permeate passageway said permeate spacer means to control the flow of the permeate and the cross-current sweep fluid comprises three juxtapositioned fluid connected regions D-E-F wherein region D and E and region E and F each have one edge immediately adjacent to said pipe and the boundary between region D and E and region E and F are a series of barrier spots in a predetermined configuration both lines generally in a substantially straight line which is substantially radial to the curved surface of the pipe to the outer edge of the module membrane.

14. The spiral wound membrane separation module of claim 1 wherein
said permeate spacer means to control the flow of permeate and cocurrent or countercurrent sweep fluid comprise three juxtapositioned fluid interconnected regions D-E-F wherein the boundaries between region D and E and region E and F are two lines of separated barrier spots in a predetermined configuration each line of a spots generally oriented in a straight line radially from the curved surface of the pipe to the outer edge of the module membrane.

15. The spiral wound membrane module of claim 1 wherein the controlled flow in the permeate passageway of the countercurrent or cocurrent fluid is enabled by permeate spacer means comprising thin line barriers.

16. The spiral wound membrane module of claim 15 wherein the open spaces between the line barriers are in fluid communication with small open reservoir which is in fluid communication with at least one radial opening at one end of the pipe.

17. The spiral wound membrane module of claim 16 wherein the permselective membrane is selected from perfluoroethylene sulfonic acid polymer, NAFION® or cellulose tricetate.

18. The spiral wound membrane module of claim 17 wherein the permeate spacer is epoxy-coated simplex fabric polyester mesh material.

19. A membrane separation device which device comprises:
(a) a housing adapted to contain a spiral-wound membrane separation module, the housing being essentially sealed to the environment and having an interior surface,
(b) a spiral-wound membrane module positioned within the housing to define a generally annular clearance space between the exterior surface of the spiral-wound module and the interior wall of the housing, the spiral-wound membrane module being designed to separate the fluid feed stream into a permeate stream and a concentrate stream,
(c) means to completely seal the annular clearance space between the exterior surface of the module and the interior surface of the housing creating a first chamber and a second chamber,
(d) mean to introduce a feed stream to the spiral-wound membrane module in said first chamber means to withdraw a concentrate stream from said second chamber, and
(e) means to withdraw a permeate stream, wherein said spiral wound membrane module comprises:
a centrally located hollow pipe,
at least one unsealed membrane envelope enclosing,
at least one porous fluid feed spacer means to provide substantially uniform flow in the feed passageway, and at least one permeate spacer means to provide substantially uniform flow in the permeate passageway, wherein said permeate passageway includes
means for enabling crosscurrent, countercurrent or cocurrent fluid sweep flow in a permeate passageway,
said generally hollow pipe having a wall barrier intermediate in its length dividing the pipe into a first compartment and a second compartment, said pipe having means for removing a fluid permeate stream from the first compartment of said pipe and means for removing a fluid permeate stream from the second compartment of the pipe, said first and second pipe compartments each having at least one radial opening through the pipe circumference through which permeate fluid will pass,
said porous sheet feed spacer means being in fluid communication with the radial fluid openings of the first and second pipe compartments,
said at least one membrane envelope comprising a sheet membrane creating a feed passageway having a first surface and a second surface opposite to the first surface wherein the membrane is folded once so that first one-half of the first surface of the membrane layer faces the other half of the first surface of the membrane envelope and interposed between the first and second surfaces of the membrane is said porous sheet fluid feed spacer means,
said permeate passageway for the fluid permeate which is formed by sealing the edges of adjacent membrane surfaces opposite to the first surface, having a porous spacer in the permeate passageway between the adjacent membrane envelope surfaces opposite the first surface,
means for removal of permeate fluid from the second fluid passageway to the exterior of the module, and
means for restraining the unspiraling of the compact module roll under operational conditions.

20. The membrane separation device of claim 19 wherein said permeate passageway comprising three juxtapositioned interconnected regions A-B-C wherein the outer higher porosity region A and outer higher porosity region C are each in fluid communication on one edge to the pipe radial openings and a second axial side of region A and a second axial side of region C are each connected to opposing sides of lower porosity region B, wherein region A axially receives the permeate at low pressure which is in fluid communication with the high pressure region B in fluid communication with low pressure region C wherein region B is not directly in fluid communication with any radial opening of the first and second compartments of the pipe.

21. The membrane separation device of claim 19 wherein said hollow pipe further includes means for injecting countercurrent sweeps fluid in one compartment of the pipe for transmission through the permeate passageway; and means for removing the countercurrent sweep fluid from the other compartment of the pipe.

22. The membrane separation device of claim 19 wherein in the permeate passageway the permeate spacer means comprise a higher porosity region D and lower porosity region E, and higher porosity region F are each defined on their common edges by two lines of spaced glue spots in a predetermined configuration in a substantially radial configuration relative to the pipe.

23. A membrane process for the removal of water, carbon dioxide, hydrogen sulfide or mixtures thereof, from a feed fluid comprising a feed fluid and water, carbon dioxide, hydrogen sulfide or mixtures thereof, which process comprises:

A. contacting the feed fluid mixture comprising at least one fluid with a membrane separation module with the higher pressure side of a semi-permeable membrane having a higher pressure side and a lower pressure side, wherein said semi-permeable membrane is selectively permeable; and the separation module comprises:

a spiral wound membrane having a semipermeable membrane for use in a housing in the separation of a fluid permeate from a fluid feed mixture, said module comprising a centrally located hollow pipe, at least one unsealed membrane envelope enclosing means to provide substantially uniform flow in the feed passageway, at least one fluid feed spacer, and at least one permeate spacer means for providing substantially uniform flow of the permeate in the permeate passageway, wherein said permeate passageway includes, flow control means for enabling crosscurrent, countercurrent or cocurrent sweep fluid flow in the permeate passageway, said generally hollow pipe having a wall barrier intermediate in its length dividing the pipe into a first compartment and a second compartment, said pipe having means for collecting a fluid permeate stream from the first compartment of said pipe and means for collecting and removing the permeate fluid stream from the second compartment of the pipe, said first and second pipe compartments each having at least one radial opening through the pipe circumference through which permeate fluid will pass, said porous sheet permeate spacer means are in fluid communication with the radial fluid openings of the first and second pipe compartments, said at least one membrane envelope comprises a sheet membrane creating a feed passageway having a first surface and a second surface opposite to the first surface wherein the membrane is folded at least once or sealed so that first one-half of the first surface of the membrane layer faces the other one-half of the first surface of the membrane envelope and interposed between the first and second surfaces of the first membrane is said porous sheet fluid feed spacer means, said permeate passageway for the fluid permeated is formed by the adjacent membrane surfaces opposite to the first surface, wherein the adjacent surfaces opposite to the first surface are sealingly adhered to each other having spacer means in the permeate passageway between the adjacent membrane envelope surfaces opposite the first surface, means for removal of permeate fluid from the permeate fluid passageway to the exterior of the module, and means for restraining the unspiraling of the compact module roll under operational conditions;

B. maintaining a vapor partial pressure differential across said membrane under conditions such that at least one fluid selected from water, carbon dioxide, hydrogen sulfide or mixtures thereof selectively permeates through said membrane from said higher pressure side to said lower pressure side of the membrane;

C. contacting said lower pressure side of said membrane with a sweep fluid, at a sufficient volumetric flowrate relative to said feed fluid mixture, whereby compounds in said feed fluid mixture selectively permeates through said semi-permeable membrane and into said sweep fluid;

D. collecting said sweep fluid containing the at least one permeated fluid selected from water, carbon dioxide, hydrogen sulfide or mixtures thereof; and E. collecting the concentrated feed fluid depleted of water, carbon dioxide, hydrogen sulfide or mixtures thereof.

24. A process for the removal of water, carbon dioxide, hydrogen sulfide or mixtures thereof from natural gas feed, which process comprises:

A. contacting with the natural gas feed fluid mixture comprising at least one gas with a separation membrane module with the higher pressure side of a semi-permeable membrane having a higher pressure side and a lower pressure side, wherein said semi-permeable membrane is selectively permeable; and the separation module comprises a membrane separation device which comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral-wound module and the interior wall of the housing, the spiral-wound membrane module being designed to separate the fluid feed stream into a permeate stream and a concentrate stream, (c) means to completely seal the annular clearance space between the exterior surface of the module and the interior surface of the housing creating a first chamber and a second chamber, (d) means to introduce a feed stream to the spiral-wound membrane module in said first chamber means to withdraw a concentrate stream from said second chamber means to withdraw a concentrate stream from said second chamber, and (e) means to withdraw a permeate stream, wherein said spiral wound membrane module comprises:

a centrally located hollow pipe, at least one unsealed membrane envelope enclosing, at least one porous fluid feed spacer means to provide substantially uniform flow in the feed passageway, and at least one permeate spacer means to provide substantially uniform flow in the permeate passageway, wherein said permeate passageway includes means for enabling crosscurrent, countercurrent or cocurrent fluid sweep flow in the permeate passageway, said generally hollow pipe having a wall barrier intermediate in its length dividing the pipe into a first compartment and a second compartment, said pipe having means for removing a fluid permeate stream from the first compartment of said pipe and means for removing a fluid permeate stream from the second compartment of the pipe, said first and second pipe compartments each having at least one radial opening through the pipe circumference through which permeates fluid will pass, said porous sheet feed spacer means being in fluid communication with the radial fluid openings of the first and second pipe compartments, said at least one membrane envelope comprising a sheet membrane creating a feed passageway having a first surface and a second surface opposite to the first surface wherein the membrane is folded once so that first one-half of the first surface of the membrane layer faces the other half of the first surface of the membrane envelope and interposed between the first and second surfaces of the membrane is said porous sheet fluid feed spacer means, said permeate passageway for the fluid permeate which is formed by sealing the edges of adjacent membrane surfaces opposite to the first surface, having a porous spacer in the permeate passageway between the adjacent membrane envelope surfaces opposite the first surface, means for removal of permeate fluid from the second fluid passageway to the exterior of the module, and means for restraining the unspiraling of the compact module roll under operational conditions;

B. maintaining a vapor partial pressure differential across said membrane under conditions such that at least one fluid selected from water, carbon dioxide, hydrogen sulfide or mixtures thereof selectively permeates through said membrane from said higher pressure side to said lower pressure side of the membrane;

C. contacting said lower pressure side of said membrane with a sweep fluid, at a sufficient volumetric flowrate relative to said feed fluid mixture, whereby compounds in said feed gas mixture selectively permeates through said semi-permeable membrane and into said sweep gas;

D. collecting said sweep gas containing permeated components selected from water, carbon dioxide, hydrogen sulfide or mixtures thereof; and E. collecting the concentrated feed natural gas depleted of water, carbon dioxide, hydrogen sulfide or mixtures thereof.

25. A process for the removal of a volatile organic fluid or a fluid from a fluid feed mixture comprising a volatile organic fluid or a fluid, which process comprises:

A. contacting with the fluid feed mixture comprising at least one volatile organic fluid with a membrane separation module, having a high pressure side of a semi-permeable membrane having a higher pressure side and a lower pressure side, wherein said semi-permeable membrane is selectively permeable; and the module comprises a membrane separation device which comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral-wound module and the interior wall of the housing, the spiral-wound membrane module being designed to separate the fluid feed stream into a permeate stream and a concentrate steam, (c) means to completely seal the annular clearance space between the exterior surface of the module and the interior surface of the housing creating a first chamber and a second chamber, (d) means to introduce a feed stream to the spiral-wound membrane module in said first chamber means to withdraw a concentrate stream from said second chamber, and (e) means to withdraw a permeate stream, wherein said spiral wound membrane module comprises:

a centrally located hollow pipe, at least one unsealed membrane envelope enclosing, at least one porous fluid feed spacer means to provide substantially uniform flow in the feed passageway, and at least one permeate spacer means to provide substantially uniform flow in the permeate passageway, wherein said permeate passageway includes means for enabling crosscurrent, countercurrent or cocurrent fluid sweep flow in a permeate passageway, said generally hollow pipe having a wall barrier intermediate in its length dividing the pipe into a first compartment and a second compartment, said pipe having means for removing a fluid permeate stream from the first compartment of said pipe and means for removing a fluid permeate stream from the second compartment of the pipe, said first and second pipe compartments each having at least one radial opening through the pipe circumference through which permeate fluid will pass, said porous sheet feed spacer means being in fluid communication with the radial fluid openings of the first and second pipe compartments, said at least one membrane envelope comprising a sheet membrane creating a feed passageway having a first surface and a second surface opposite to the first surface wherein the membrane is folded once so that first one-half of the first surface of the membrane layer faces the other half of the first surface of the membrane envelope and interposed between the first and second surfaces of the membrane is said porous sheet fluid feed spacer means, said permeate passageway for the fluid permeate which is formed by sealing the edges of adjacent membrane surfaces opposite to the first surface, having a porous spacer in the permeate passageway between the adjacent membrane envelope surfaces opposite the first surface, means for removal of permeate fluid from the second fluid passageway to the exterior of the module, and means for restraining the unspiraling of the compact module roll under operational conditions;

B. maintaining a vapor partial pressure differential across said membrane under conditions such that at least one component of the feed fluid selectively permeates through said membrane from said higher pressure side to said lower pressure side of the membrane;

C. contacting said lower pressure side of said membrane with a sweep fluid, at a sufficient volumetric flowrate relative to said feed fluid mixture, whereby compounds in said feed fluid mixture selectively permeates through said semi-permeable membrane and into said sweep fluid;

D. collecting said sweep fluid containing permeated components; and

E. collecting the concentrated feed fluid depleted of organic volatile fluid, a fluid or mixtures thereof.

26. A process of facilitated transport removal of water carbon dioxide, hydrogen sulfide or mixtures thereof from a natural gas feed, which process comprises:

A. contacting with the feed natural gas mixture with a membrane separation module, the higher pressure side of a semipermeable membrane having a higher pressure side and a lower pressure side, wherein said semi-permeable membrane is selectively permeable; and the separation module comprises a membrane separation device, which comprises:

(a) a housing adapted to contain a spiral-wound membrane separation module, the housing being essentially sealed to the environment and having an interior surface, (b) a spiral-wound membrane module positioned within the housing to define a generally annular clearance space between the exterior surface of the spiral-wound module and the interior wall of the housing, the spiral-wound membrane module being designed to separate the fluid feed stream into a permeate stream and a concentrate steam, (c) means to completely seal the annular clearance space between the exterior surface of the module and the interior surface of the housing creating a first chamber and a second chamber, (d) means to introduce a feed stream to the spiral-wound membrane module in said first chamber means to withdraw a concentrate stream from said second chamber, and (e) means to withdraw a permeate stream, wherein said spiral wound membrane module comprises:

a centrally located hollow pipe, at least one unsealed membrane envelope enclosing, at least one porous fluid feed spacer means to provide substantially uniform flow in the feed passageway, and at least one permeate spacer means to provide substantially uniform flow in the permeate passageway, wherein said permeate passageway includes means for enabling crosscurrent, countercurrent or cocurrent fluid sweep flow in a permeate passageway, said generally hollow pipe having a wall barrier intermediate in its length dividing the pipe into a first compartment and a second compartment, said pipe having means for removing a fluid permeate stream from the first compartment of said pipe and means for removing a fluid permeate stream from the second compartment of the pipe, said first and second pipe compartments each having at least one radial opening through the pipe circumference through which permeate fluid will pass, said porous sheet feed spacer means being in fluid communication with the radial fluid openings of the first and second pipe compartments, said at least one membrane envelope comprising a sheet membrane creating a feed passageway having a first surface and a second surface opposite to the first surface wherein the membrane is folded once so that first one-half of the first surface of the membrane layer faces the other half of the first surface of the membrane envelope and interposed between the first and second surfaces of the membrane is said porous sheet fluid feed spacer means, said permeate passageway for the fluid permeate which is formed by sealing the edges of adjacent membrane surfaces opposite to the first surface, having a porous spacer in the permeate passageway between the adjacent membrane envelope surfaces opposite the first surface, means for removal of permeate fluid from the second fluid passageway to the exterior of the module, and means for restraining the unspiraling of the compact module roll under operational conditions;

B. maintaining a vapor partial pressure differential across said membrane under conditions such that at least one fluid thereof selectively permeates through said membrane from said higher pressure side to said lower pressure side of the membrane;

C. contacting said lower pressure side of said membrane with a sweep fluid, at a sufficient volumetric flowrate relative to said feed natural gas mixture, whereby compounds in said feed natural gas mixture selectively permeates through said semi-permeable membrane and into said sweep fluid;

D. collecting said sweep fluid containing at least one permeated component; and

E. collecting the effluent feed natural gas depleted of water, carbon dioxide, hydrogen sulfide or mixtures thereof.

* * * * *

UNITED STATES PATENT AND TRADEMARK OFFICE
CERTIFICATE OF CORRECTION

PATENT NO. : 5,096,584
DATED : March 17, 1992
INVENTOR(S) : Damoder Reddy et al.

It is certified that error appears in the above-identified patent and that said Letters Patent is hereby corrected as shown below:

On the cover page, in line 3 of the Abstract, "permeate" has been misspelled;

Column 28, line 18, part (d), delete "mean" and insert -- means --;

Column 30, line 16, delete "permeated" and insert -- permeate --;

Column 31, line 10, delete the second reference to the phrase "means to withdraw a concentrate stream from said second chamber";

Column 31, line 25, delete "the" and insert -- a --;

Column 31, line 36, delete "permeates" and insert -- permeate --;

Column 34, line 53, after "fluid" insert -- selected from water, carbon dioxide, hydrogen sulfide or mixtures --;

UNITED STATES PATENT AND TRADEMARK OFFICE
CERTIFICATE OF CORRECTION

PATENT NO. : 5,096,584

DATED : March 17, 1992

INVENTOR(S) : Damoder Reddy et al.

It is certified that error appears in the above-identified patent and that said Letters Patent is hereby corrected as shown below:

Column 34, line 59, delete "compounds" and insert -- components --;

Column 34, line 60, delete "permeates" and insert -- permeate --.

Signed and Sealed this

Thirteenth Day of July, 1993

Attest:

MICHAEL K. KIRK

*Attesting Officer*      *Acting Commissioner of Patents and Trademarks*